(12) United States Patent
Zhang et al.

(10) Patent No.: US 11,271,818 B2
(45) Date of Patent: Mar. 8, 2022

(54) METHOD, APPARATUS, AND SYSTEM FOR OBTAINING NETWORK SLICE

(71) Applicant: HUAWEI TECHNOLOGIES CO., LTD., Shenzhen (CN)

(72) Inventors: Zhongjian Zhang, Dongguan (CN); Yuanlong Jiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/137,405

(22) Filed: Dec. 30, 2020

(65) Prior Publication Data

US 2021/0119879 A1 Apr. 22, 2021

Related U.S. Application Data

(63) Continuation of application No. PCT/CN2019/076217, filed on Feb. 27, 2019.

(30) Foreign Application Priority Data

Jun. 30, 2018 (CN) .......................... 201810702468.3

(51) Int. Cl.
*G06F 15/173* (2006.01)
*H04L 41/12* (2022.01)
(Continued)

(52) U.S. Cl.
CPC .......... *H04L 41/12* (2013.01); *H04L 41/0816* (2013.01); *H04L 41/0893* (2013.01)

(58) Field of Classification Search
CPC .. H04L 41/12; H04L 41/0816; H04L 41/0893
See application file for complete search history.

(56) References Cited

U.S. PATENT DOCUMENTS

2017/0086118 A1 3/2017 Vrzic et al.
2018/0041904 A1 2/2018 Shimojou et al.
(Continued)

FOREIGN PATENT DOCUMENTS

CN 106572517 A 4/2017
CN 107659419 A 2/2018
(Continued)

OTHER PUBLICATIONS

Extended European Search Report issued in EP 19824994.8, dated Jul. 6, 2021, 9 pages.
(Continued)

*Primary Examiner* — Wing F Chan
*Assistant Examiner* — Joseph R Maniwang

(57) ABSTRACT

This application discloses a method for obtaining a network slice. The method includes: receiving, by a control device, a slice request sent by a user, where the slice request includes an identifier, and the identifier is used to identify an isolation level of a slice requested by the user; obtaining, by the control device, an isolation type of the slice based on the identifier; and creating, by the control device, a network slice based on the isolation type of the slice and a resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

22 Claims, 9 Drawing Sheets

(51) Int. Cl.
*H04L 41/0816* (2022.01)
*H04L 41/0893* (2022.01)

(56) References Cited

U.S. PATENT DOCUMENTS

| | | | |
|---|---|---|---|
| 2018/0049015 A1 | 2/2018 | Gupta et al. | |
| 2018/0132138 A1 | 5/2018 | Senarath et al. | |
| 2019/0230004 A1* | 7/2019 | Zhou | ............... H04L 67/10 |

FOREIGN PATENT DOCUMENTS

| | | | |
|---|---|---|---|
| CN | 108076531 A | 5/2018 | |
| CN | 108111931 A | 6/2018 | |
| EP | 3273647 A1 | 1/2018 | |
| EP | 3496465 A1 | 6/2019 | |
| WO | 2017080517 A1 | 5/2017 | |
| WO | 2017181779 A1 | 10/2017 | |
| WO | 2018019184 A1 | 2/2018 | |
| WO | 2018058579 A1 | 4/2018 | |
| WO | 2018086622 A1 | 5/2018 | |

OTHER PUBLICATIONS

3GPP TR 28.801 V15.1.0 (Jan. 2018), 3rd Generation Partnership Project; Technical Specification Group Services and System Aspects;Telecommunication management; Study on management and orchestration of network slicing for next generation network (Release 15), total 75 pages.

3GPP TS 28.530 V1.0.0 (Jun. 2018), 3rd Generation Partnership Project; Technical Specification Group Services and System Aspects;Telecommunication management; Management of 5G networks and network slicing; Concepts, use cases and requirements (Release 15), total 30 pages.

3GPP TS 23.501 V15.2.0 (Jun. 2018), 3rd Generation Partnership Project; Technical Specification Group Services and System Aspects; System Architecture for the 5G System; Stage 2 (Release 15), total 217 pages.

International Search Report and Written Opinion issued in PCT/CN2019/076217 dated May 8, 2019, total 10 pages.

Office Action issued in CN 201810702468.3, dated Mar. 15, 2021, 8 pages.

Notice of Allowance issued in CN201810702468.3, dated Jan. 17, 2022, 4 pages.

* cited by examiner ial Application No. PCT/CN2019/076217, filed on Feb. 27, 2019, which claims priority to Chinese Patent Application No. 201810702468.3, filed on Jun. 30, 2018. The disclosures of the aforementioned applications are hereby incorporated by reference in their entireties.

TECHNICAL FIELD

This application relates to the communications field, and in particular, to a method, an apparatus, and a system for obtaining a network slice.

BACKGROUND

FIG. 1 is a schematic diagram of a network scenario of obtaining a network slice. In the scenario shown in FIG. 1, a control device includes an orchestrator, a controller of a network A, and a controller of a network B. The controller 1 of the network A communicates with a node included in the network A, to obtain topology information of the network A. The network A includes a node A, a node B, a node C, and a node D. The controller 1 sends the obtained topology information of the network A to the orchestrator. The controller 2 of the network B communicates with a node included in the network B, to obtain topology information of the network B. The network B includes a node E, a node F, a node G, and a node H. The controller 2 sends the obtained topology information of the network B to the orchestrator. The orchestrator may obtain information about a topology between the node A and the node H based on the topology information of the network A and the topology information of the network B. The information about the topology includes node information and link information. The node information includes a node identifier (ID), a node terminal point (Node-TP), and a node location. The Node-TP is a physical port of a node or a logical port of a node. The link information includes a link ID, a source node ID, a source link TP (source-TP), a destination node ID, and a destination link TP (dest-TP). The source node ID is used to identify a source node of a link. The source link TP is used to identify a TP of the source node of the link. The destination node ID is used to identify a destination node of the link. The destination link TP is used to identify a TP of the destination node of the link. Herein, only a control device including an orchestrator and a plurality of controllers is used as an example for description. In practice, the foregoing processing may alternatively be performed by a control device of another type that does not have an orchestrator, and the control device of another type may directly manage the networks A and B.

A process of communication between a node and any one of the foregoing control devices does not include exchanging node isolation information or link isolation information, and the control device does not have a capability of processing an isolation function. Correspondingly, the topology information obtained by the control device does not include isolation information. In this case, when a service deployed in a network managed and controlled by the control device needs to implement a specific isolation capability, the control device cannot provide a fine-grained management and control service, resulting in impact on service running to some extent. For example, a network slice service is described below.

The orchestrator receives a slice request sent by a user. The slice request includes a parameter related to a service-level agreement (SLA). The parameter related to the SLA is used to indicate a service instance corresponding to a network slice instance (NSI). The orchestrator calculates, based on the slice request and the information about the topology between the node A and the node H, a network resource that meets the slice request, to form the NSI. In the scenario shown in FIG. 1, the orchestrator can obtain, based on only the SLA in the slice request of the user, that both a path A-B-C-E-G-H and a path A-B-D-F-G-H can meet the SLA. When a service that the slice request requests to deploy needs to implement a specific isolation capability, the orchestrator cannot select, from the path A-B-C-E-G-H and the path A-B-D-F-G-H, a path that supports the specific isolation capability. Consequently, a corresponding network resource cannot be allocated to the service corresponding to the slice request, and the isolation capability required by the service cannot be implemented.

SUMMARY

Embodiments of this application provide a method, an apparatus, and a system for obtaining a network slice, to create a network slice that matches an isolation capability required by a service, thereby implementing the isolation capability required by the service.

According to a first aspect, a method for obtaining a network slice is provided, where the method includes: receiving, by a control device, a slice request sent by a user, where the slice request includes an identifier, and the identifier is used to identify an isolation level of a slice requested by the user; obtaining, by the control device, an isolation type of the slice based on the identifier; and creating, by the control device, a network slice based on the isolation type of the slice and a resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

In the foregoing method, the control device can determine the isolation type of the slice based on the slice request, and thereby select, from the resource topology based on the isolation type, an element for implementing the slice, so that an isolation capability of the selected element matches the isolation type. In this way, the control device creates the network slice by using the element, thereby implementing the isolation capability required by the service.

In a design of the first aspect, the N elements include a first node, a second node, and a link between the first node and the second node, and the method further includes: obtaining, by the control device, first resource information from the first node according to an isolation policy, where the first resource information includes isolation information provided by the first node and a topology of the first node; obtaining, by the control device, second resource information from the second node according to an isolation policy, where the second resource information includes isolation information provided by the second node and a topology of the second node; and generating, by the control device, a resource topology based on the first resource information and the second resource information, where the resource topology is used to describe the network topology, an isolation capability of the first node, an isolation capability of the second node, and an isolation capability of the link between the first node and the second node, and the network topology is a topology between the first node and the second node.

In the foregoing design, the control device generates, based on the isolation capabilities of the elements in a network, the resource topology that can support some isolation capabilities. In this way, when creating the network slice, the control device may generate, based on the isolation capability supported by the resource topology, a slice having the isolation capability, and the slice can implement the isolation capability required by the service. The control device may flexibly obtain configuration data according to the isolation policy, and thereby obtain the resource topology having a specific isolation capability.

In a design of the first aspect, the obtaining, by the control device, first resource information from the first node according to an isolation policy includes: generating, by the control device, first configuration data according to the isolation policy, where the first configuration data is used to describe the isolation capability of the first node; sending, by the control device, the first configuration data to the first node; and receiving, by the control device, the first resource information sent by the first node, where the first resource information includes the isolation information provided by the first node and the topology of the first node, and the topology of the first node is used to describe the first node and a link on which the first node is located.

In a design of the first aspect, the obtaining, by the control device, second resource information from the second node according to an isolation policy includes: generating, by the control device, second configuration data according to the isolation policy, where the second configuration data is used to describe the isolation capability of the second node; sending, by the control device, the second configuration data to the second node; and receiving, by the control device, the second resource information sent by the second node, where the second resource information includes the isolation information provided by the second node and the topology of the second node, and the topology of the second node is used to describe the second node and a link on which the second node is located.

In a design of the first aspect, the generating, by the control device, first configuration data according to an isolation policy includes: obtaining, by the control device, the isolation capability of the first node according to the isolation policy, where the isolation capability of the first node includes isolation capabilities of the first node and the link on which the first node is located; and generating, by the control device based on the isolation capability of the first node and a data model, the first configuration data described by using the data model.

In a design of the first aspect, the generating, by the control device, second configuration data according to an isolation policy includes: obtaining, by the control device, the isolation capability of the second node according to the isolation policy, where the isolation capability of the second node includes isolation capabilities of the second node and the link on which the second node is located; and generating, by the control device based on the isolation capability of the second node and the data model, the second configuration data described by using the data model.

In a design of the first aspect, the generating, by the control device, a resource topology based on the first resource information and the second resource information includes: determining, by the control device, a first isolation type based on the isolation information provided by the first node and the isolation information provided by the second node; and obtaining, by the control device based on the first isolation type and the network topology, a first resource topology matching the first isolation type, where an isolation capability of a node included in the first resource topology is the first isolation type, and an isolation capability of a link included in the first resource topology is the first isolation type.

In a design of the first aspect, the generating, by the control device, a resource topology based on the first resource information and the second resource information further includes: determining, by the control device, a second isolation type based on the isolation information provided by the first node and the isolation information provided by the second node; and obtaining, by the control device based on the second isolation type and the network topology, a second resource topology matching the second isolation type, where an isolation capability of a node included in the second resource topology is the second isolation type, and an isolation capability of a link included in the second resource topology is the second isolation type.

In the foregoing design, the control device may generate, based on the different isolation types, the sub-resource topologies that match the isolation types. The control device further generates the resource topology based on the sub-resource topologies that match the isolation types.

In a design of the first aspect, the first isolation type is fine-grained physical isolation, coarse-grained physical isolation, or logical isolation, the second isolation type is fine-grained physical isolation, coarse-grained physical isolation, or logical isolation, and the second isolation type is different from the first isolation type.

In a design of the first aspect, the first isolation type is network isolation, link isolation, or node isolation, the second isolation type is network isolation, node physical isolation, or link isolation, and the second isolation type is different from the first isolation type.

In a design of the first aspect, the creating, by the control device, a network slice based on the isolation type of the slice and a resource topology includes: selecting, by the control device from the resource topology based on the isolation type of the slice, a sub-resource topology matching the isolation type of the slice, where an isolation capability of a node included in the sub-resource topology is the isolation type of the slice, and an isolation capability of a link included in the sub-resource topology is the isolation type of the slice; and storing, by the control device, a correspondence between the sub-resource topology and the identifier.

In a design of the first aspect, the creating, by the control device, a network slice based on the isolation type of the slice and a resource topology further includes: obtaining, by the control device based on the slice request, service information corresponding to the slice; obtaining, by the control device, an ingress terminal point TP and an egress TP of a third node based on the sub-resource topology, where an isolation capability of the ingress TP is an isolation capability of the slice, an isolation capability of the egress TP is the isolation capability of the slice, the isolation capability of the ingress TP supports the isolation capability of the node included in the sub-resource topology and the isolation capability of the link included in the sub-resource topology, and the isolation capability of the egress TP supports the isolation capability of the node included in the sub-resource topology and the isolation capability of the link included in the sub-resource topology; and sending, by the control device to the third node, a correspondence including the service information, the ingress TP, and the egress TP.

In a design of the first aspect, after the creating a network slice, the method further includes: obtaining, by the control device, updated isolation information from the first node, where the updated isolation information is used to describe a newly added isolation capability in the first node or an invalid isolation capability in the first node; and obtaining, by the control device, an updated resource topology based on the updated isolation information and the resource topology, where the updated resource topology is used to describe the network topology, an updated isolation capability of the first node, the isolation capability of the second node, and an updated isolation capability of the link between the first node and the second node.

In the foregoing design, the control device may update the generated resource topology based on the updated isolation information actively reported by the first node, to meet an isolation capability required by a subsequent service.

In a design of the first aspect, the isolation level is a user level, a service level, a tunnel level, a system level, a slot level, a wavelength level, a port level, a device level, or a network level, and the isolation capability is an isolation function that is of an element and that corresponds to the isolation level. The device level can be further divided into forwarding isolation, cross-connection isolation, and system isolation.

According to a second aspect, a method for obtaining a resource topology is provided, where the method includes: obtaining, by a control device, first resource information from a first node according to an isolation policy, where the first resource information includes isolation information provided by the first node and a topology of the first node; obtaining, by the control device, second resource information from a second node according to an isolation policy, where the second resource information includes isolation information provided by the second node and a topology of the second node; and generating, by the control device, a resource topology based on the first resource information and the second resource information, where the resource topology is used to describe a network topology, an isolation capability of the first node, an isolation capability of the second node, and an isolation capability of a link between the first node and the second node, and the network topology is a topology between the first node and the second node.

In the foregoing method, the control device generates, based on the isolation capabilities of the elements in a network, the resource topology that can support some isolation capabilities. In this way, when creating the network slice, the control device may generate, based on the isolation capability supported by the resource topology, a slice having the isolation capability, and the slice can implement the isolation capability required by the service. The control device may flexibly obtain configuration data according to the isolation policy, and thereby obtain the resource topology having a specific isolation capability.

In a design of the second aspect, the obtaining, by the control device, first resource information from the first node according to an isolation policy includes: generating, by the control device, first configuration data according to the isolation policy, where the first configuration data is used to describe the isolation capability of the first node; sending, by the control device, the first configuration data to the first node; and receiving, by the control device, the first resource information sent by the first node, where the first resource information includes the isolation information provided by the first node and the topology of the first node, and the topology of the first node is used to describe the first node and a link on which the first node is located.

In a design of the second aspect, the obtaining, by the control device, second resource information from the second node according to an isolation policy includes: generating, by the control device, second configuration data according to the isolation policy, where the second configuration data is used to describe the isolation capability of the second node; sending, by the control device, the second configuration data to the second node; and receiving, by the control device, the second resource information sent by the second node, where the second resource information includes the isolation information provided by the second node and the topology of the second node, and the topology of the second node is used to describe the second node and a link on which the second node is located.

In a design of the second aspect, the generating, by the control device, first configuration data according to an isolation policy includes: obtaining, by the control device, the isolation capability of the first node according to the isolation policy, where the isolation capability of the first node includes isolation capabilities of the first node and the link on which the first node is located; and generating, by the control device based on the isolation capability of the first node and a data model, the first configuration data described by using the data model.

In a design of the second aspect, the generating, by the control device, second configuration data according to an isolation policy includes: obtaining, by the control device, the isolation capability of the second node according to the isolation policy, where the isolation capability of the second node includes isolation capabilities of the second node and the link on which the second node is located; and generating, by the control device based on the isolation capability of the second node and the data model, the second configuration data described by using the data model.

In a design of the second aspect, the generating, by the control device, a resource topology based on the first resource information and the second resource information includes:

determining, by the control device, a first isolation type based on the isolation information provided by the first node and the isolation information provided by the second node; and obtaining, by the control device based on the first isolation type and the network topology, a first resource topology matching the first isolation type, where an isolation capability of a node included in the first resource topology is the first isolation type, and an isolation capability of a link included in the first resource topology is the first isolation type.

In a design of the second aspect, the generating, by the control device, a resource topology based on the first resource information and the second resource information further includes: determining, by the control device, a second isolation type based on the isolation information provided by the first node and the isolation information provided by the second node; and obtaining, by the control device based on the second isolation type and the network topology, a second resource topology matching the second isolation type, where an isolation capability of a node included in the second resource topology is the second isolation type, and an isolation capability of a link included in the second resource topology is the second isolation type.

In a design of the second aspect, the method further includes: obtaining, by the control device, updated isolation information from the first node, where the updated isolation information is used to describe a newly added isolation capability in the first node or an invalid isolation capability in the first node; and obtaining, by the control device, an updated resource topology based on the updated isolation information and the resource topology, where the updated resource topology is used to describe the network topology, an updated isolation capability of the first node, the isolation capability of the second node, and an updated isolation capability of the link between the first node and the second node.

In a design of the second aspect, the method further includes: receiving, by the control device, a slice request sent by a user, where the slice request includes an identifier, and the identifier is used to identify an isolation level of a slice requested by the user; obtaining, by the control device, an isolation type of the slice based on the identifier; and creating, by the control device, a network slice based on the isolation type of the slice and the resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

According to a third aspect, a control device is provided, where the control device includes a receiving unit, a first obtaining unit, and a creation unit. The receiving unit is configured to receive a slice request sent by a user, where the slice request includes an identifier, and the identifier is used to identify an isolation level of a slice requested by the user; the first obtaining unit is configured to obtain an isolation type of the slice based on the identifier; and the creation unit is configured to create a network slice based on the isolation type of the slice and a resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

In a design of the third aspect, the N elements include a first node, a second node, and a link between the first node and the second node; and the control device further includes a second obtaining unit, a third obtaining unit, and a generating unit. The second obtaining unit is configured to obtain first resource information from the first node according to an isolation policy, where the first resource information includes isolation information provided by the first node and a topology of the first node; the third obtaining unit is configured to obtain second resource information from the second node according to an isolation policy, where the second resource information includes isolation information provided by the second node and a topology of the second node; and the generating unit is configured to generate a resource topology based on the first resource information and the second resource information, where the resource topology is used to describe the network topology, an isolation capability of the first node, an isolation capability of the second node, and an isolation capability of the link between the first node and the second node, and the network topology is a topology between the first node and the second node.

In one or more designs of the third aspect, the units included in the control device can implement any design of the first aspect. The control device in any one of the third aspect or the designs of the third aspect is an apparatus configured to obtain a network slice.

According to a fourth aspect, a control device is provided, where the control device includes a first obtaining unit, a second obtaining unit, and a generating unit. The second obtaining unit is configured to obtain first resource information from a first node according to an isolation policy, where the first resource information includes isolation information provided by the first node and a topology of the first node; the second obtaining unit is configured to obtain second resource information from a second node according to an isolation policy, where the second resource information includes isolation information provided by the second node and a topology of the second node; and the generating unit is configured to generate a resource topology based on the first resource information and the second resource information, where the resource topology is used to describe a network topology, an isolation capability of the first node, an isolation capability of the second node, and an isolation capability of a link between the first node and the second node, and the network topology is a topology between the first node and the second node.

In a design of the fourth aspect, the first obtaining unit is specifically configured to: generate first configuration data according to the isolation policy, where the first configuration data is used to describe the isolation capability of the first node; send the first configuration data to the first node; and receive the first resource information sent by the first node, where the first resource information includes the isolation information provided by the first node and the topology of the first node, and the topology of the first node is used to describe the first node and a link on which the first node is located.

In a design of the fourth aspect, the second obtaining unit is specifically configured to: generate second configuration data according to the isolation policy, where the second configuration data is used to describe the isolation capability of the second node; send the second configuration data to the second node; and receive the second resource information sent by the second node, where the second resource information includes the isolation information provided by the second node and the topology of the second node, and the topology of the second node is used to describe the second node and a link on which the second node is located.

In a design of the fourth aspect, the first obtaining unit is specifically configured to: obtain the isolation capability of the first node according to the isolation policy, where the isolation capability of the first node includes isolation capabilities of the first node and the link on which the first node is located; and generate, based on the isolation capability of the first node and a data model, the first configuration data described by using the data model.

In a design of the fourth aspect, the second obtaining unit is specifically configured to: obtain the isolation capability of the second node according to the isolation policy, where the isolation capability of the second node includes isolation capabilities of the second node and the link on which the second node is located; and generate, based on the isolation capability of the second node and the data model, the second configuration data described by using the data model.

In a design of the fourth aspect, the generating unit is specifically configured to: determine a first isolation type based on the isolation information provided by the first node and the isolation information provided by the second node; and obtain, based on the first isolation type and the network topology, a first resource topology matching the first isolation type, where an isolation capability of a node included in the first resource topology is the first isolation type, and an isolation capability of a link included in the first resource topology is the first isolation type.

In a design of the fourth aspect, the generating unit is further specifically configured to: determine a second isolation type based on the isolation information provided by the first node and the isolation information provided by the second node; and obtain, based on the second isolation type and the network topology, a second resource topology matching the second isolation type, where an isolation capability of a node included in the second resource topology is the second isolation type, and an isolation capability of a link included in the second resource topology is the second isolation type.

In a design of the fourth aspect, the control device further includes a third obtaining unit and an updating unit. The third obtaining unit is configured to obtain updated isolation information from the first node, where the updated isolation information is used to describe a newly added isolation capability in the first node or an invalid isolation capability in the first node; and the updating unit is configured to obtain an updated resource topology based on the updated isolation information and the resource topology, where the updated resource topology is used to describe the network topology, an updated isolation capability of the first node, the isolation capability of the second node, and an updated isolation capability of the link between the first node and the second node.

In a design of the fourth aspect, the control device further includes a receiving unit, a fourth obtaining unit, and a creation unit. The receiving unit is configured to receive a slice request sent by a user, where the slice request includes an identifier, and the identifier is used to identify an isolation level of a slice requested by the user; the fourth obtaining unit is configured to obtain an isolation type of the slice based on the identifier; and the creation unit is configured to create a network slice based on the isolation type of the slice and the resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

In a design of the fourth aspect, the creation unit may create the network slice according to the method for obtaining a network slice provided in one or more designs of the first aspect. The control device in any one of the fourth aspect or the designs of the fourth aspect is an apparatus configured to obtain a network slice.

According to a fifth aspect, a control device is provided, where the control device includes an orchestrator. The orchestrator is configured to: receive a slice request sent by a user, where the slice request includes an identifier, and the identifier is used to identify an isolation level of a slice requested by the user; obtain an isolation type of the slice based on the identifier; and create a network slice based on the isolation type of the slice and a resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

In a design of the fifth aspect, the N elements include a first node, a second node, and a link between the first node and the second node. The orchestrator is specifically configured to:

obtain first resource information from the first node according to an isolation policy, where the first resource information includes isolation information provided by the first node and a topology of the first node; obtain second resource information from the second node according to an isolation policy, where the second resource information includes isolation information provided by the second node and a topology of the second node; and generate a resource topology based on the first resource information and the second resource information, where the resource topology is used to describe the network topology, an isolation capability of the first node, an isolation capability of the second node, and an isolation capability of the link between the first node and the second node, and the network topology is a topology between the first node and the second node.

In a design of the fifth aspect, the control device further includes a first domain controller and a second domain controller. The orchestrator is specifically configured to: generate first configuration data according to the isolation policy, where the first configuration data is used to describe the isolation capability of the first node; and generate second configuration data according to the isolation policy, where the second configuration data is used to describe the isolation capability of the second node. The first domain controller is specifically configured to:

send the first configuration data from the orchestrator to the first node; and receive the first resource information sent by the first node, where the first resource information includes the isolation information provided by the first node and the topology of the first node, and the topology of the first node is used to describe the first node and a link on which the first node is located. The second domain controller is specifically configured to: send the second configuration data from the orchestrator to the second node; and receive the second resource information sent by the second node, where the second resource information includes the isolation information provided by the second node and the topology of the second node, and the topology of the second node is used to describe the second node and a link on which the second node is located.

In one or more designs of the fifth aspect, the orchestrator can implement any design of the first aspect. The control device in any one of the fifth aspect or the designs of the fifth aspect is an apparatus configured to obtain a network slice.

According to a sixth aspect, a control device is provided, where the control device includes an orchestrator. The orchestrator is specifically configured to: obtain first resource information from a first node according to an isolation policy, where the first resource information includes isolation information provided by the first node and a topology of the first node; obtain second resource information from a second node according to an isolation policy, where the second resource information includes isolation information provided by the second node and a topology of the second node; and generate a resource topology based on the first resource information and the second resource information, where the resource topology is used to describe a network topology, an isolation capability of the first node, an isolation capability of the second node, and an isolation capability of a link between the first node and the second node, and the network topology is a topology between the first node and the second node.

In a design of the sixth aspect, the control device further includes a first domain controller. The orchestrator is specifically configured to: generate first configuration data according to the isolation policy, where the first configuration data is used to describe the isolation capability of the first node; send the first configuration data to the first node by using the first domain controller; and receive, by using the first domain controller, the first resource information sent by the first node, where the first resource information includes the isolation information provided by the first node and the topology of the first node, and the topology of the first node is used to describe the first node and a link on which the first node is located.

In a design of the sixth aspect, the control device further includes a second domain controller. The orchestrator is specifically configured to: generate second configuration data according to the isolation policy, where the second configuration data is used to describe the isolation capability of the second node; send the second configuration data to the second node by using the second domain controller; and receive, by using the second domain controller, the second resource information sent by the second node, where the second resource information includes the isolation information provided by the second node and the topology of the second node, and the topology of the second node is used to describe the second node and a link on which the second node is located.

In a design of the sixth aspect, the orchestrator is specifically configured to: obtain the isolation capability of the first node according to the isolation policy, where the isolation capability of the first node includes isolation capabilities of the first node and the link on which the first node is located; and generate, based on the isolation capability of the first node and a data model, the first configuration data described by using the data model.

In a design of the sixth aspect, the orchestrator is specifically configured to: obtain the isolation capability of the second node according to the isolation policy, where the isolation capability of the second node includes isolation capabilities of the second node and the link on which the second node is located; and generate, based on the isolation capability of the second node and the data model, the second configuration data described by using the data model.

In a design of the sixth aspect, the orchestrator is specifically configured to: determine a first isolation type based on the isolation information provided by the first node and the isolation information provided by the second node; and obtain, based on the first isolation type and the network topology, a first resource topology matching the first isolation type, where an isolation capability of a node included in the first resource topology is the first isolation type, and an isolation capability of a link included in the first resource topology is the first isolation type.

In a design of the sixth aspect, the orchestrator is further specifically configured to:

determine a second isolation type based on the isolation information provided by the first node and the isolation information provided by the second node; and obtain, based on the second isolation type and the network topology, a second resource topology matching the second isolation type, where an isolation capability of a node included in the second resource topology is the second isolation type, and an isolation capability of a link included in the second resource topology is the second isolation type.

In a design of the sixth aspect, the orchestrator is specifically configured to: obtain updated isolation information from the first node, where the updated isolation information is used to describe a newly added isolation capability in the first node or an invalid isolation capability in the first node; and obtain an updated resource topology based on the updated isolation information and the resource topology, where the updated resource topology is used to describe the network topology, an updated isolation capability of the first node, the isolation capability of the second node, and an updated isolation capability of the link between the first node and the second node. The orchestrator may obtain updated isolation information from the first node by using the first domain controller.

In a design of the sixth aspect, the orchestrator is specifically configured to: receive a slice request sent by a user, where the slice request includes an identifier, and the identifier is used to identify an isolation level of a slice requested by the user; obtain an isolation type of the slice based on the identifier; and create a network slice based on the isolation type of the slice and the resource topology, where the resource topology is used to describe the network topology and isolation capabilities of N elements in the network topology, the N elements include at least one of a node and a link, N is an integer greater than or equal to 1, and the network slice includes a node and a link that are required for implementing the slice.

In a design of the sixth aspect, the orchestrator may create the network slice according to the method for creating a network slice provided in one or more designs of the first aspect.

According to a seventh aspect, a computer-readable storage medium is provided. The computer-readable storage medium includes an instruction, and when the instruction is run on a computer, the computer is enabled to perform the method for obtaining a network slice according to any one of the first aspect or the possible designs of the first aspect.

According to an eighth aspect, a computer-readable storage medium is provided. The computer-readable storage medium includes an instruction, and when the instruction is run on a computer, the computer is enabled to perform the method for obtaining a resource topology according to any one of the second aspect or the possible designs of the second aspect.

According to a ninth aspect, a computer program product including an instruction is provided. When the computer program product is run on a computer, the computer is enabled to perform the method for obtaining a network slice according to any one of the first aspect or the possible designs of the first aspect.

According to a tenth aspect, a computer program product including an instruction is provided. When the computer program product is run on a computer, the computer is enabled to perform the method for obtaining a resource topology according to any one of the second aspect or the possible designs of the second aspect.

According to an eleventh aspect, a control device is provided. The control device includes a processor, a memory, a bus, and a communications interface. The memory is configured to store a computer-executable instruction. The processor and the memory are connected by using the bus. When the control device operates, the processor executes the computer-executable instruction stored in the memory, to enable the control device to perform the method for obtaining a network slice according to any one of the first aspect or the possible designs of the first aspect. The control device may be the control device mentioned in any one of the first aspect or the possible designs of the first aspect.

According to a twelfth aspect, a control device is provided. The control device includes a processor, a memory, a bus, and a communications interface. The memory is configured to store a computer-executable instruction. The processor and the memory are connected by using the bus. When the control device operates, the processor executes the computer-executable instruction stored in the memory, to enable the control device to perform the method for obtaining a resource topology according to any one of the second aspect or the possible designs of the second aspect. The control device may be the control device mentioned in any one of the second aspect or the possible designs of the second aspect.

According to a thirteenth aspect, a network device is provided. The network device includes a receiving unit, an obtaining unit, and a sending unit. The receiving unit is configured to receive configuration data from a control device, where the configuration data is used to describe an isolation capability of the network device. The obtaining unit is configured to obtain sub-resource information based on the configuration data, where the sub-resource information includes isolation information provided by the network device and a topology of the network device, and the topology of the network device is used to describe the network device and a link on which the network device is located. The sending unit is configured to send the sub-resource information to the control device.

According to a fourteenth aspect, a network device is provided. The network device includes a processor, a memory, a bus, and a communications interface. The memory is configured to store a computer-executable instruction. The processor and the memory are connected by using the bus. When the control device operates, the processor executes the computer-executable instruction stored in the memory, to enable the network device to perform the following operations: receiving configuration data from a control device, where the configuration data is used to describe an isolation capability of the network device; obtaining sub-resource information based on the configuration data, where the sub-resource information includes isolation information provided by the network device and a topology of the network device, and the topology of the network device is used to describe the network device and a link on which the network device is located; and sending the sub-resource information to the control device.

The network device provided in the thirteenth aspect or the fourteenth aspect may be the first node in any one of the first aspect or the designs of the first aspect, or the second node in any one of the second aspect or the designs of the second aspect.

According to a fifteenth aspect, a system for obtaining a network slice is provided. The system includes the network device provided in the twelfth aspect or the thirteenth aspect, and the control device provided in any one of the third aspect to the eleventh aspect or any design of any one of the third aspect to the eleventh aspect.

BRIEF DESCRIPTION OF DRAWINGS

To describe the technical solutions in the embodiments of this application more clearly, the following briefly describes the accompanying drawings required for describing the embodiments.

DESCRIPTION OF EMBODIMENTS

The following describes the embodiments of the present invention with reference to accompanying drawings.

Embodiment 1

Figure 1:
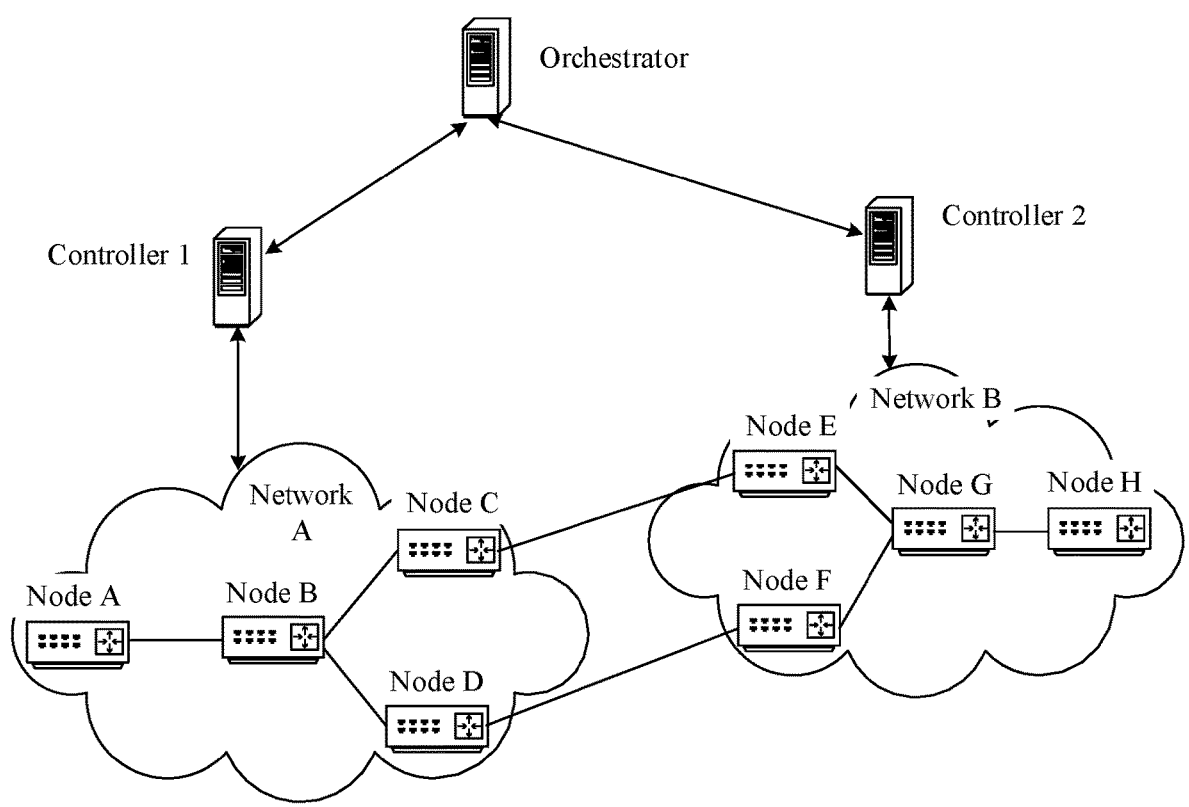
FIG. 1 is a schematic diagram of a network scenario of obtaining a network slice.
Figure 2:
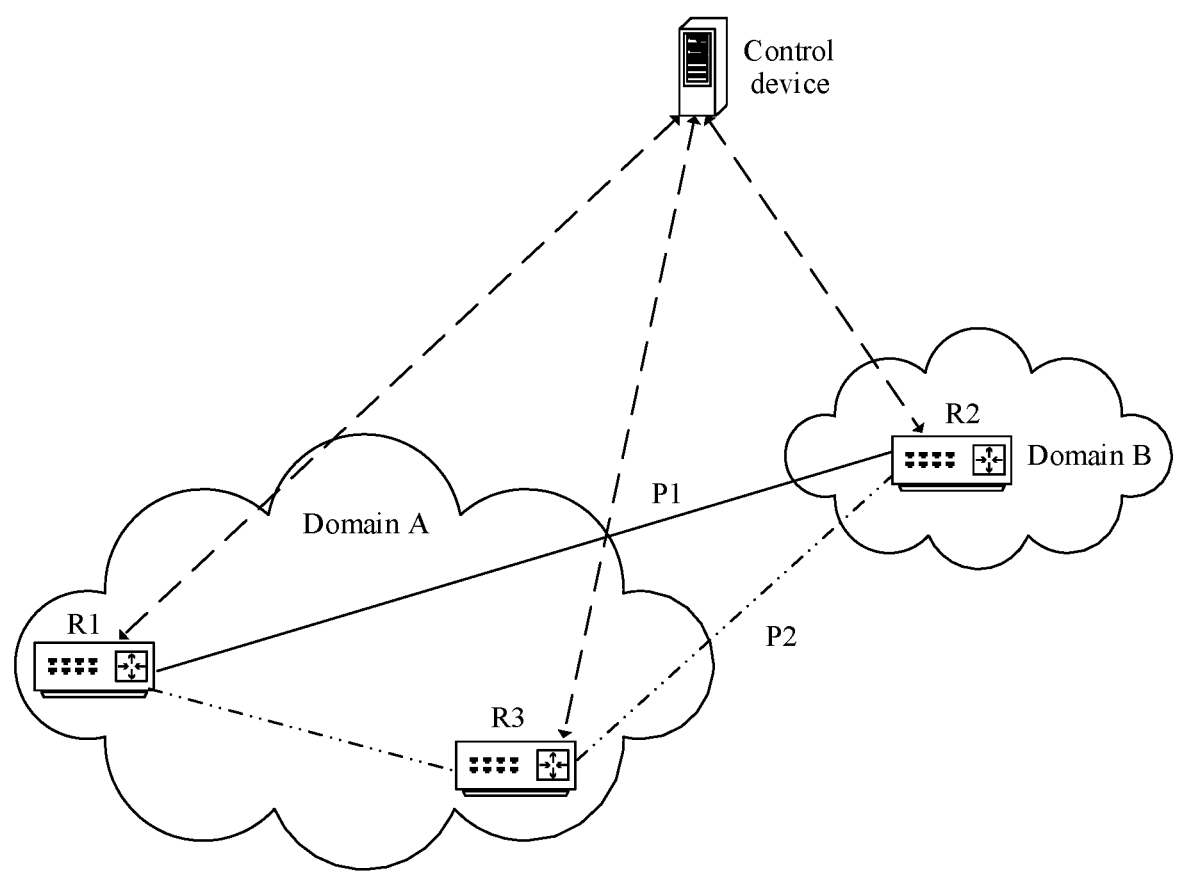
FIG. 2 is a schematic diagram of a network scenario according to Embodiment 1 of this application.

FIG. 2 is a schematic diagram of a network scenario according to Embodiment 1 of this application. In the scenario shown in FIG. 2, a domain A includes a plurality of nodes, for example, R1 and R3 in FIGS. 2. R1 and R3 may be edge nodes in the domain A. A domain B includes at least one node, for example, R2 in FIG. 2. R2 may be an edge node in the domain B. The domain A may be a wireless network, a bearer network, or a core network. The domain B may be a wireless network, a bearer network, or a core network. The domain A and the domain B may be subnets in a same network, or the domain A and the domain B may be different networks. A control device can communicate with nodes in the domain A and the domain B, and configure the nodes in the domain A and the domain B. R1 and R2 may communicate with each other through a plurality of paths, for example, P1 and P2 in FIGS. 2. P1 and P2 are used to identify different paths. A path identified by P1 may be represented as R1-R2. A path identified by P2 may be represented as R1-R3-R2. The node in this embodiment of this application may be a forwarding device or a server in the network. The forwarding device in the network may be a router or a switch. The control device in this embodiment may be a software-defined networking (SDN) controller or a controller of another type.

Figure 3:
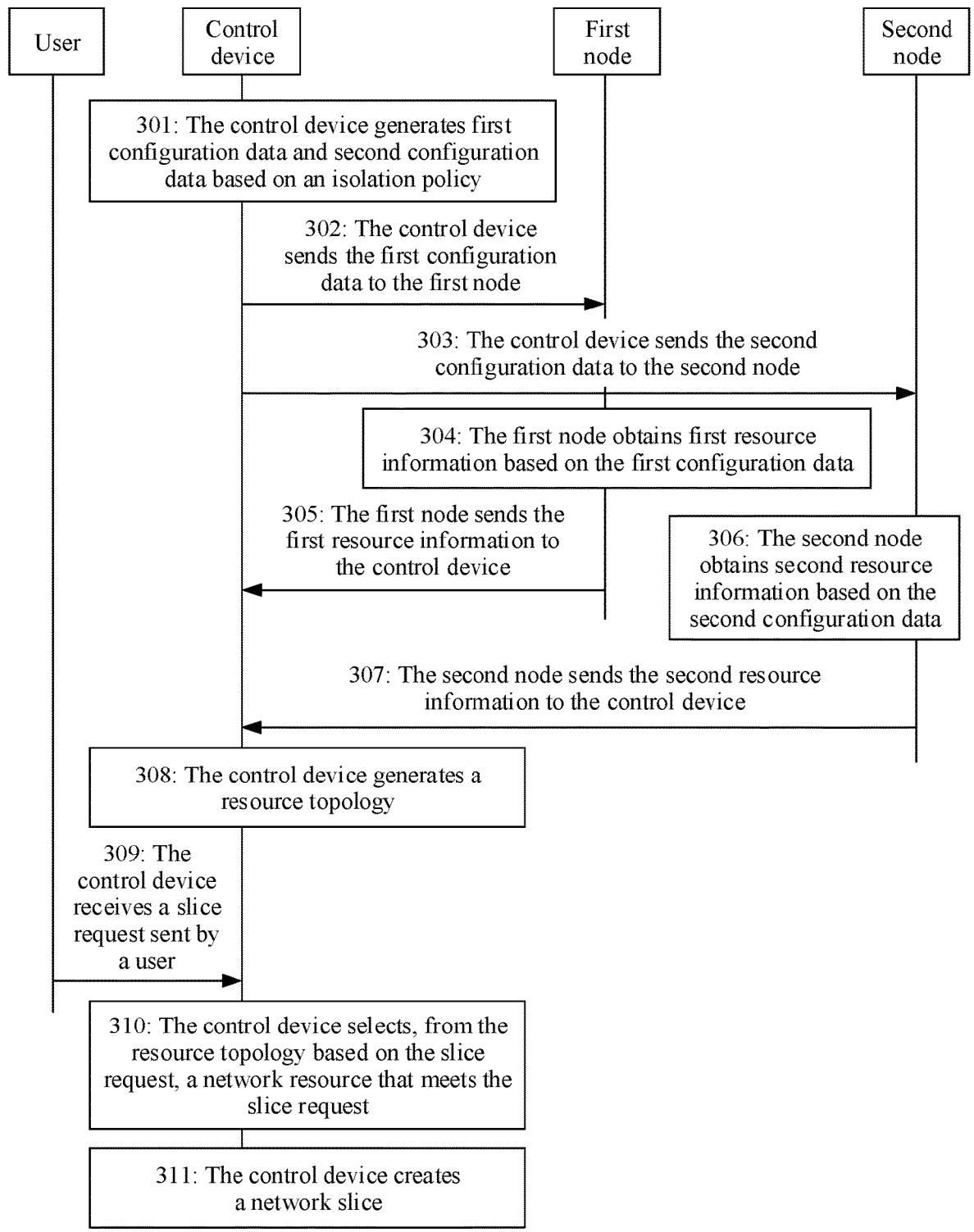
FIG. 3 is a schematic flowchart of a method for obtaining a network slice according to Embodiment 1 of this application.

FIG. 3 is a schematic flowchart of a method for obtaining a network slice according to Embodiment 1 of this application. The method provided in Embodiment 1 of this application is described below with reference to FIG. 2 and FIG. 3.

301: A control device generates first configuration data and second configuration data according to an isolation policy.

For example, the first configuration data is used to describe an isolation capability of a first node, and the second configuration data is used to describe an isolation capability of a second node. The control device may receive an isolation policy delivered by an operation support system (OSS). The isolation policy is used to describe isolation levels of a node in a network and a link on which the node is located. The isolation policy may be set based on isolation levels shown in FIG. 4A and FIG. 4B. Specifically, the control device obtains, according to the isolation policy, the isolation capability of the first node and the isolation capability of the second node. The isolation capability of the first node includes isolation capabilities of the first node and links on which the first node is located. The isolation capability of the second node includes isolation capabilities of the second node and links on which the second node is located. The isolation capability mentioned in this embodiment of this application is an isolation function (an isolation level or an isolation function included in the isolation level shown in FIG. 4A and FIG. 4B) that can be implemented by an element in the network, and the element in the network is a node in the network or a link in the network.

The control device generates the first configuration data based on the isolation capability of the first node and a data model. The control device generates the second configuration data based on the isolation capability of the second node and the data model. The data model used by the control device may be a YANG model. The links on which the first node is located include a link on which the first node is a start node, a link on which the first node is an intermediate node, and a link on which the first node is an end node. The links on which the second node is located include a link on which the second node is a start node, a link on which the second node is an intermediate node, and a link on which the second node is an end node.

Figure 4A:
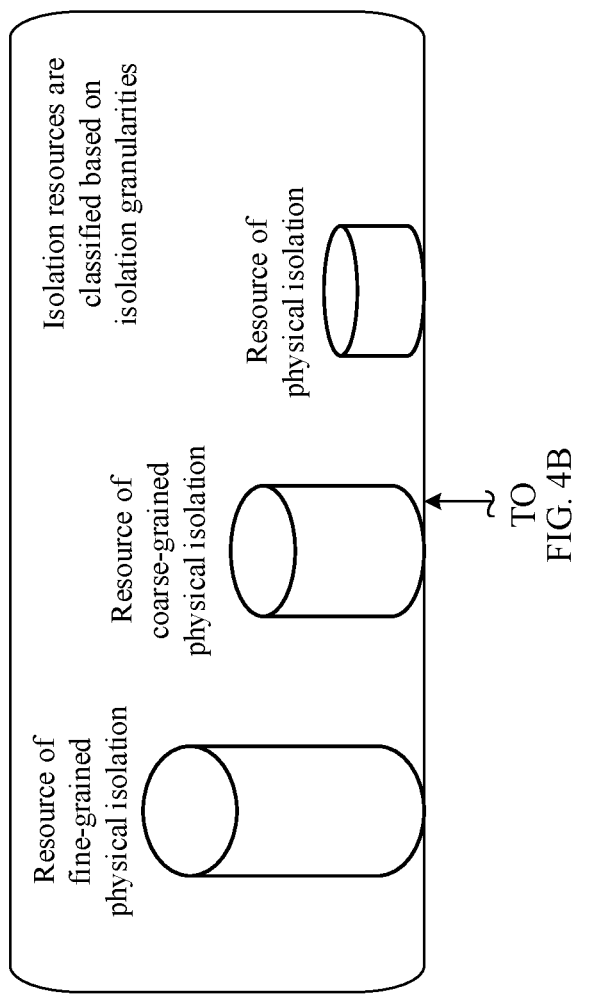
FIG. 4A and FIG. 4B are schematic diagrams of performing isolation level classification on a network resource according to Embodiment 1 of this application.
Figure 4B:
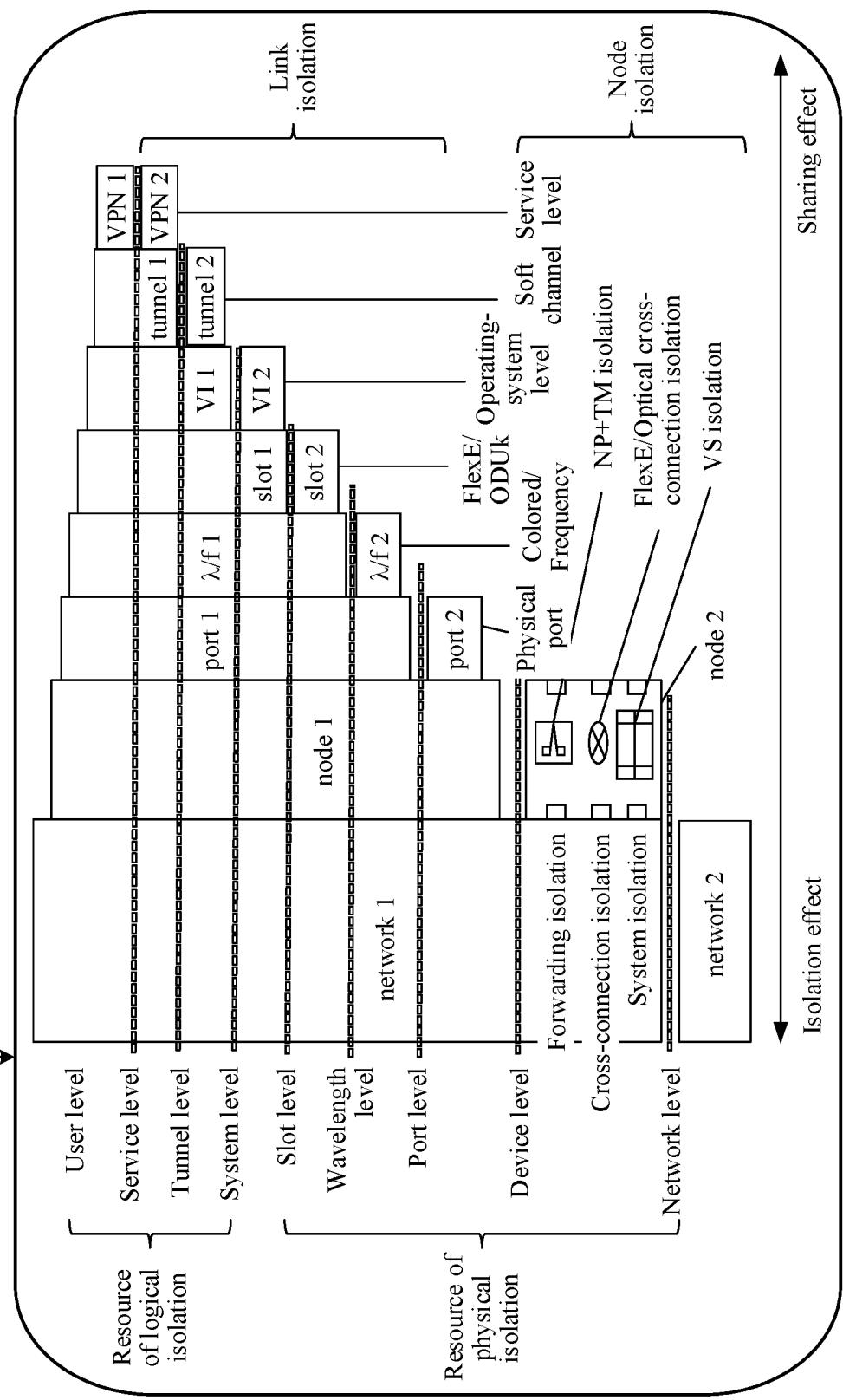

When isolation level classification is performed based on an isolation granularity, resources in the network may be classified into three types (as shown in a cylindrical classification diagram in FIG. 4A and FIG. 4B): (1) resources having a fine-grained physical isolation capability; (2) resources having a coarse-grained physical isolation capability; and (3) resources that do not have a physical isolation capability (which are resources having a logical isolation capability). A condition for performing coarse-grained physical isolation by using the resources of type (2) is that a physical device or a physical port is not used by a slice. If the physical device or the physical port is used by a slice, the resources of type (2) can no longer implement the isolation function. The resources of type (3) are resources that do not have a physical isolation capability, but a resource of type (3) may be used by a plurality of network slices that have a sharing feature. For example, if a rate of a physical link is 100 G, and a 50 G bandwidth has been occupied by a network slice, the remaining 50 G bandwidth of the link is a resource of type (3). Resource topologies of four types may be obtained based on the foregoing resources of the three types: a resource topology that corresponds to the resources of type (1) and that has a fine-grained physical isolation capability, a resource topology that corresponds to the resources of type (1) and type (2) and that has a physical isolation capability, a resource topology that corresponds to the resources of type (3) and that has a logical isolation capability, and an all-resource topology corresponding to the resources of the three types. The resources of type (1) and type (2) may further provide a logical isolation capability. When the resource topology having the logical isolation capability is obtained by using the resource of type (3), the resource topology having the logical isolation capability may be further obtained based on the resources of type (2) and type (3), or the resource topology having the logical isolation capability is obtained based on the resources of type (1) and type (3). As shown in FIG. 4A and FIG. 4B, isolation levels of the foregoing three types of resources may be further classified.

Isolation levels of resources having the physical isolation capability may be further classified into a slot level, a wavelength level, a port level, a device level, and a network level. For the slot level, isolation capability classification is performed based on the flexible ethernet (FlexE), an optical channel data unit (ODUk), or a transmission container (T-cont). For the wavelength level, isolation capability classification is performed based on a ratio of a wavelength to a frequency. For the port level, isolation capability classification is performed based on a physical port, flexible ethernet (FlexE) cross, an optical cross-connection, or a network processor (NP)+traffic management (TM). An isolation capability supporting the FlexE cross indicates that the FlexE cross is supported in the ethernet. An isolation capability supporting the optical cross-connection indicates that the optical cross-connection is supported in an optical network. An isolation capability supporting NP+TM indicates that both NP isolation and TM isolation are supported. For the device level, isolation capability classification is performed based on a device attribute. For the network level, isolation capability classification is performed based on a network attribute. The network attribute can be a home-customer-dedicated network, a group-customer-dedicated network, a 5G-bearer-dedicated network, or a shared network. The shared network may be applicable to all services. Isolation levels of the resources having the logical isolation capability may be further performed according to a user level, a service level, a tunnel level, and a system level. For the service level, isolation capability classification is performed based on a virtual private network (VPN). For the tunnel level, isolation capability classification is performed based on a tunnel attribute. For an isolation capability of the system level, isolation capability classification may be performed based on a virtual system (VS), for example, isolation capability classification based on a virtual port (VI) of the virtual system. If identification is performed based on an isolation granularity, resources of the user level and the service level are fine-grained logical isolation resources; resources of the tunnel level and the system level are coarse-grained logical isolation resources; resources of the slot level, the wavelength level, forwarding isolation, and cross-connection isolation are fine-grained physical isolation resources; and resources of the port level, the device level, the network level, and system isolation are coarse-grained physical isolation resources. For the forwarding isolation, the cross-connection isolation, and the system isolation, isolation level classification is further performed based on isolation of the device level.

When isolation capability classification is performed based on an isolation technology, resources in the network may be classified into three types: (1) resources having a network isolation capability; (2) resources having a node isolation capability; and (3) resources having a link isolation capability. Isolation levels of the resources having the network isolation capability may be further classified into a (1.1) home-customer-dedicated network, a (1.2) group-customer-dedicated network, a (1.3) 5G-bearer-dedicated network, and a (1.4) shared network. Isolation levels of the resources having the node isolation capability may be further classified into an (2.1) all-port level, a (2.2) part-of-port level, a (2.3) system level, and a (2.4) logic level. For the (2.1) all-port level, isolation capability classification may be performed based on NP+TM. For the (2.2) part-of-port level, isolation capability classification may be performed based on a FlexE cross or an optical cross-connection. For the (2.3) system level, isolation capability classification is performed based on a VI. A resource of the (2.4) logical level is a node that has a logical isolation capability but does not have a physical isolation capability. Isolation levels of the resources having the link isolation capability may be further classified into a (3.1) slot level, a (3.2) wavelength level, a (3.3) physical-port level, and a (3.4) logic level. For the (3.1) slot level, isolation capability classification is performed based on FlexE, ODUk, or T-cont. For the (3.2) wavelength level, isolation capability classification is performed based on a ratio of a wavelength to a frequency. For the (3.3) physical-port level, isolation capability classification is performed based on a physical port included on a link. A resource of the (3.4) logical level is a link that has a logical isolation capability but does not have a physical isolation capability.

For example, the control device may obtain a correspondence according to the isolation policy, where the isolation policy includes an isolation level used for an element in a network of a specific type. The network of the specific type may be selected from (1.1) to (1.4). The element in the network may be a node, a link, or a node TP. The isolation level may be selected from the isolation levels in FIG. 4A and FIG. 4B. The correspondence includes a network identifier and a resource classification table. The resource classification table includes the element in the network and the isolation level of the element. In the scenario shown in FIG. 2, the isolation policy obtained by the control device is to use the following isolation levels for a non-home-customer-dedicated network:

(1) A node having an NP+TM isolation capability satisfies the node isolation level corresponding to (2.1). Using four bits to represent an isolation capability of the node, where the four bits respectively represent, from left to right, the isolation levels corresponding to (2.1), (2.2), (2.3), and (2.4), an isolation level of the node is represented as "1000". The isolation level of the node identified by "1000" indicates that the node has the all-port level isolation capability.

(2) A link having a FlexE isolation capability satisfies the link isolation level corresponding to (3.1). Using four bits to represent an isolation capability of the link, where the four bits respectively represent, from left to right, the isolation levels corresponding to (3.1), (3.2), (3.3), and (3.4), an isolation level of the link is represented as "1000". The isolation level of the link identified by "1000" indicates that the link has the slot-level isolation capability.

(3) A link having a physical-port isolation capability satisfies the link isolation level corresponding to (3.3). Using four bits to represent an isolation capability of the link, where the four bits respectively represent, from left to right, the isolation levels corresponding to (3.1), (3.2), (3.3), and (3.4), an isolation level of the link is represented as "0010". The isolation level of the link identified by "0010" indicates that the link has the physical-port-level isolation capability.

The control device may configure data for R1, R2, and R3 based on the foregoing isolation policy. Configuration data of R1, R2, and R3 may be described by using the following YANG data model. Details are as follows:

303: The control device sends the second configuration data to the second node, and then the second node performs 306.

In 302 and 303, by using the network configuration protocol (NETCONF), the control device may send, to the first node, the first configuration data described by using the YANG data model, and send, to the second node, the second configuration data described by using the YANG data model. In the scenario shown in FIG. 2, the control device respectively sends, to R1, R2, and R3 by using NETCONF, the configuration data described in the YANG data model in 301.

304: The first node obtains first resource information based on the first configuration data.

For example, an attribute of each TP of the first node is configured on the first node. The attribute of the TP is used to indicate an isolation capability supported by the TP. The first node obtains, based on the first configuration data from the control device, identifiers of M1 TPs that meet an isolation capability in the first configuration data and an identifier of the first node. The M1 TPs include at least one ingress TP and at least one egress TP. The first node obtains the first resource information based on the identifiers of the M1 TPs, isolation capabilities of the M1 TPs, and the identifier of the first node. The first resource information includes isolation information provided by the first node and a topology of the first node. The isolation information provided by the first node is used to indicate an isolation capability that the first node has and that matches the first configuration data, for example, an isolation capability corresponds to a TP that is on the first node and that matches the first configuration data. For details, refer to a part of the first node in resource information described by using the YANG model in 308. The topology of the first node is a physical topology of the first node, or the topology of the first node is a logical topology of the first node. The topology of the first node is used to describe the first node and the links on which the first node is located. The links on which the first node is located may be represented by TPs connecting the first node to each link. The TP connecting the first node to a link may be referred to as a link terminal point (TP) of the first node. A link in this embodiment of this application is a physical link, or a link is a logical link.

305: The first node sends the first resource information to the control device, and then the control device performs 308.

For example, the first node may send the first resource information to the control device by using NETCONF. The first resource information may be described by using the YANG model.

```
augment ../../../nw:node/node-id
   grouping node-attributes {
          case "node-isolated-attributes = 'NP+TMenable ' " ;
          leaf node-isolated-level{ type uint16 { value "1000"; }} //node isolation is 1000
   }
   grouping link-attributes {
          case "source-tp=flexeenabled & dest-tp=flexeenable";
          leaf link-isolated-level{ type uint16 { value "1000"; }} //link isolation is 1000
   }
   grouping link-attributes {
          case "source-tp= physical-port & dest-tp=physical-port";
          leaf link-isolated-level{ type uint16 { value "0010"; }} //link isolation is 0010
   }
```

302: The control device sends the first configuration data to the first node, and then the first node performs 304.

306: The second node obtains second resource information based on the second configuration data.

For example, an attribute of each TP of the second node is configured on the second node. The attribute of the TP is used to indicate an isolation capability supported by the TP. The second node obtains, based on the second configuration data from the control device, identifiers of M2 TPs that meet an isolation capability in the second configuration data and an identifier of the second node. The M2 TPs include at least one ingress TP and at least one egress TP. The second node obtains the second resource information based on the identifiers of the M2 TPs, isolation capabilities of the M2 TPs, and the identifier of the second node. The second resource information includes isolation information provided by the second node and a topology of the second node. The isolation information provided by the second node is used to indicate an isolation capability that the second node has and that matches the second configuration data, for example, an isolation capability corresponding to a TP that is on the second node and that matches the second configuration data. For details, refer to a part of the second node in resource information described by using the YANG model in 308. The topology of the second node is a physical topology of the second node, or the topology of the second node is a logical topology of the second node. The topology of the second node is used to describe the second node and the links on which the second node is located. The links on which the second node is located may be represented by TPs connecting the second node to a link. The TP connecting the second node to the link may be referred to as a link terminal point (TP) of the second node. A link in this embodiment of this application is a physical link, or a link is a logical link.

307: The second node sends the second resource information of the second node to the control device, and then the control device performs 308.

For example, the second node may send the second resource information to the control device by using NETCONF. The second resource information may be described by using the YANG model.

308: The control device generates a resource topology.

For example, the control device obtains resource information based on the first resource information from the first node and the second resource information from the second node. The resource information includes the topology of the first node, the topology of the second node, the isolation information provided by the first node, and the isolation information provided by the second node. A set formed by the topology of the first node and the topology of the second node is used to describe a topology between the first node and the second node, for example, a node and a link that can perform communication between the first node and the second node, or a link that can perform communication between the first node and the second node. In the scenario shown in FIGS. 2, R1 and R2 may communicate with each other by using the two links P1 and P2. If R1 is the first node, and R2 is the second node, a topology between R1 and R2 includes R1, R2, R3, P1, and P2. R1, R2, and R3 all have the (2.1) all-port level isolation capability. R1, R2, and R3 respectively have three, three, and two link TPs. Identifiers of the three link TPs of R1 are respectively 1-0-1, 1-2-1, and 1-3-1. The link TP identified by 1-2-1 can communicate with R2. The link TP identified by 1-3-1 can communicate with R3. Identifiers of the two link TPs of R3 are respectively 3-1-1 and 3-2-1. The link TP identified by 3-1-1 can communicate with R1. The link TP identified by 3-2-1 can communicate with R2. Identifiers of the three link TPs of R2 are respectively 2-1-1, 2-0-1, and 2-3-1. The link TP identified by 2-1-1 can communicate with R1. The link TP identified by 2-3-1 can communicate with R3. P1 has the (3.3) physical-port-level isolation capability. Bandwidth link_rate of P1 is 50 G. P2 has the (3.1) slot-level isolation capability. Bandwidth link_rate of P2 is 30 G. The control device may obtain resource information corresponding to the domain A and the domain B based on resource information from R1, resource information from R2, and resource information from R3. The resource information corresponding to the domain A and the domain B may be represented, by using the YANG model, as follows:

```
{
    "ietf-network:networks": {
        "network": [
            {
                "network-types": {
                },
                "network-id": "otn-hc",
                "network-attributes": "0111", //An isolation level (a network type) corresponding to a network isolation capability
                "node": [
                    {
                        "node-id": "R1",
                        "node-isolated-level": "1000", //An isolation level corresponding to a node isolation capability
                        "node-isolated-tp": "all",
                        "termination-point": [
                            {
                                "tp-id": "1-0-1"
                            },
                            {
                                "tp-id": "1-2-1"
                            },
                            {
                                "tp-id": "1-3-1"
                            }
                        ]
                    },
                    {
                        "node-id": "R2",
                        "node-isolated-level": "1000", //An isolation level corresponding to a node isolation capability
                        "node-isolated-tp": "all",
                        "termination-point": [
```

```
                {
                    "tp-id": "2-0-1"
                },
                {
                    "tp-id": "2-1-1"
                },
                {
                    "tp-id": "2-3-1"
                }
            ]
        },
        {
            "node-id": "R3",
            "node-isolated-level": "1000", //An isolation level corresponding
```
to a node isolation capability
```
            "node-isolated-tp": "all",
            "termination-point": [
                {
                    "tp-id": "3-1-1"
                },
                {
                    "tp-id": "3-2-1"
                }
            ]
        }
    ],
    "ietf-network-topology:link": [
        {
            "link-id": "R1,1-2-1,R2,2-1-1",
            "link-isolated-level": "0010", //An isolation level corresponding
```
to a link isolation capability
```
            "link-rate": "50G",
            "destination": {
                "source-node": "R1",
                "source-tp": "1-2-1"
            }
            "destination": {
                "dest-node": "R2",
                "dest-tp": "2-1-1"
            }
        },
        {
            "link-id": "R2,2-1-1,R1,1-2-1",
            "link-isolated-level": "0010", //An isolation level corresponding
```
to a link isolation capability
```
            "link-rate": "50G",
            "destination": {
                "source-node": "R2",
                "source-tp": "2-1-1"
            }
            "destination": {
                "dest-node": "R1",
                "dest-tp": "1-2-1"
            }
        },
        {
            "link-id": "R1,1-3-1,R3,3-1-1",
            "link-isolated-level": "1000", //An isolation level corresponding
```
to a link isolation capability
```
            "link-rate": "30G",
            "destination": {
                "source-node": "R1",
                "source-tp": "1-3-1"
            }
            "destination": {
                "dest-node": "R3",
                "dest-tp": "3-1-1"
            }
        },
        {
            "link-id": "R3,3-1-1,R1,1-3-1",
            "link-isolated-level": "1000", //An isolation level corresponding
```
to a link isolation capability
```
            "link-rate": "30G",
            "destination": {
                "source-node": "R3",
                "source-tp": "3-1-1"
            }
            "destination": {
```

```
                    "dest-node": "R1",
                    "dest-tp": "1-3-1"
                }
            },
            {
                "link-id": "R2,2-3-1,R3,3-2-1",
                "link-isolated-level": "1000", //An isolation level corresponding
                                               to a link isolation capability
                "link-rate": "30G",
                "destination": {
                    "source-node": "R2",
                    "source-tp": "2-3-1"
                }
                "destination": {
                    "dest-node": "R3",
                    "dest-tp": "3-2-1"
                }
            },
            {
                "link-id": "R3,3-2-1,R2,2-3-1",
                "link-isolated-level": "1000", //An isolation level corresponding
                                               to a link isolation capability
                "link-rate": "30G",
                "destination": {
                    "source-node": "R3",
                    "source-tp": "3-2-1"
                }
                "destination": {
                    "dest-node": "R2",
                    "dest-tp": "2-3-1"
                }
            }
        ]
    }
  ]
 }
}
```

For example, that the control device generates the resource topology based on the resource information includes: determining, by the control device, a first isolation type based on the isolation information provided by the first node and the isolation information provided by the second node; and obtaining, by the control device based on the first isolation type and a topology, a first resource topology matching the first isolation type, where an isolation capability of a node included in the first resource topology is the first isolation type, and an isolation capability of a link included in the first resource topology is the first isolation type. When the resource topology includes sub-resource topologies of a plurality of isolation types, for example, the resource topology includes the first resource topology and a second resource topology, in addition to the first resource topology obtained by the control device by using the foregoing method, the control device may further obtain the second resource topology. A method for obtaining the second resource topology by the control device includes: determining, by the control device, a second isolation type based on the isolation information provided by the first node and the isolation information provided by the second node; and obtaining, by the control device based on the second isolation type and the topology, the second resource topology matching the second isolation type, where an isolation capability of a node included in the second resource topology is the second isolation type, and an isolation capability of a link included in the second resource topology is the second isolation type. The topology is a physical topology or a logical topology obtained by the control device based on the topology of the first node and the topology of the second node. The first isolation type and the second isolation type may be types used to indicate isolation granularities, for example, fine-grained physical isolation, coarse-grained physical isolation, or logical isolation. In the scenario shown in FIG. 2, based on the resources obtained through division based on the isolation granularities in 301, the control device may form four types of resource topologies, that is, a resource topology having a fine-grained physical isolation capability, a resource topology having a coarse-grained physical isolation capability, a resource topology having a logical isolation capability, and an all-resource topology. P1 has a coarse-grained physical isolation capability, and therefore R1-R2 forms a resource topology having the coarse-grained physical isolation capability. Although R1 and R2 have a fine-grained physical isolation capability, the fine-grained physical isolation capability of R1 and R2 may be downward compatible with the coarse-grained physical isolation capability, that is, the isolation capability of the resource topology formed between R1 and R2 is determined by a low-level isolation capability. P2 has a fine-grained physical isolation capability, and therefore R1-R3-R2 forms a resource topology having the fine-grained physical isolation capability.

309: The control device receives a slice request sent by a user.

For example, the slice request sent by the user includes an identifier, and the identifier is used to describe an isolation level of a slice requested by the slice request. The identifier may be information or a parameter directly identifying the isolation level. Alternatively, the identifier may be information or a parameter used to identify a service type. The service type corresponds to the isolation level. The control device may determine an isolation type based on the information or the parameter used to identify the service type. The control device performs lookup in the correspondence based on the isolation level, to obtain an isolation type that matches the isolation level. Isolation types and isolation levels may be classified based on different dimensions. In an implementation, the isolation type may be fine-grained physical isolation, coarse-grained physical isolation, or logical isolation. In another implementation, the isolation type may be network isolation, node isolation, or link isolation. Isolation levels of the isolation types may be further classified. An isolation level is used to describe an isolation requirement. In an implementation, the isolation level may be highest-level isolation, lowest-level isolation, common-level isolation, or no isolation. The control device may determine, based on the isolation level, an isolation type that matches the isolation level. For example, an isolation type matching the highest-level isolation is fine-grained physical isolation, an isolation type matching the common-level isolation is fine-grained physical isolation, an isolation type matching the lowest-level isolation is coarse-grained physical isolation, and an isolation type matching the no isolation is logical isolation. In another implementation, the isolation level may be a user level, a service level, a tunnel level, a system level, a slot level, a wavelength level, a port level, a device level, or a network level. The control device may determine, based on the isolation level, an isolation type that matches the isolation level. For example, an isolation type matching the service-level isolation is logical isolation or link isolation, and an isolation type matching the NP+TM (port-level) isolation is coarse-grained physical isolation or node isolation. For details, refer to content of FIG. 4A and FIG. 4B and related descriptions. In the scenario shown in FIG. 2, according to a first slice request sent by the user, a first network slice needs to be deployed. A bandwidth required for the first network slice is 40 G. An identifier included in the first slice request is used to indicate that an isolation level of the first network slice is the lowest-level isolation. According to a second slice request sent by the user, a second network slice needs to be deployed. A bandwidth required for the second network slice is 10 G. An identifier included in the second slice request is used to indicate that an isolation level of the second network slice is the highest-level isolation. According to a third slice request sent by the user, a third network slice needs to be deployed. A bandwidth required for the third network slice is 10 G. An identifier included in the third slice request is used to indicate that an isolation level of the third network slice is the highest-level isolation.

310: The control device selects, from the resource topology based on the slice request, a network resource that meets the slice request.

For example, when the isolation type is fine-grained physical isolation, the control device calculates, in a resource topology having the fine-grained physical isolation capability, the network resource required by the slice request. If the resource topology having the fine-grained physical isolation capability cannot meet the network resource required by the slice request, the control device outputs an alarm signal for prompting. When the isolation type is coarse-grained physical isolation, the control device calculates, in a resource topology having the coarse-grained physical isolation capability, the network resource required by the slice request. If the resource topology having the coarse-grained physical isolation capability can meet the network resource required by the slice request, the control device selects a network resource from the resource topology having the coarse-grained physical isolation capability. If the resource topology having the coarse-grained physical isolation capability cannot meet the network resource required by the slice request, the control device calculates, in the resource topology having the fine-grained physical isolation capability, the network resource required by the slice request. If a topology formed by a resource having the fine-grained physical isolation capability and a resource having the coarse-grained physical isolation capability can meet the network resource required by the slice request, the control device selects a network resource from the resource topology having the coarse-grained physical isolation capability and the fine-grained physical isolation capability. If the topology formed by the resource having the fine-grained physical isolation capability and the resource having the coarse-grained physical isolation capability cannot meet the network resource required by the slice request, the control device outputs an alarm signal for prompting. If the control device determines, based on the identifier included in the slice request, that isolation is not required, the control device calculates, in a resource topology having the logical isolation capability, the network resource required by the slice request.

In the scenario shown in FIG. 2, the bandwidth required for the first network slice is 40 G. The control device determines, based on an identifier included in the first slice request, that the first network slice corresponds to coarse-grained physical isolation. The control device determines, based on the resource topology in 308, that the coarse-grained physical resource topology between R1 and R2 can meet a requirement of the first network slice. The bandwidth required for the second network slice is 10 G. The control device determines, based on an identifier included in the second slice request, that the second network slice corresponds to fine-grained physical isolation. The control device determines, based on the resource topology in 308, that the fine-grained physical resource topology between R1, R3, and R2 can meet a requirement of the second network slice. The bandwidth required for the third network slice is 10 G. The control device determines, based on an identifier included in the third slice request, that the third network slice corresponds to fine-grained physical isolation. The control device determines, based on the resource topology in 308, that the fine-grained physical resource topology between R1, R3, and R2 can meet a requirement of the third network slice.

311: The control device creates a network slice.

For example, after calculating the network resource required by the slice request, the control device stores a correspondence between the network resource and the network slice. The control device generates N to-be-configured nodes and configuration information of the N nodes based on the network resource, where N is an integer greater than 1. The N to-be-configured nodes are nodes in the network resource. A topology formed by the N to-be-configured nodes is used to implement a service corresponding to the slice request. The control device delivers the generated configuration information to corresponding nodes, thereby creating the network slice. In the scenario shown in FIG. 2, the control device selects, based on the bandwidth of P1 and the first slice request, P1 for deployment of the first network slice. The control device delivers configuration information corresponding to the first network slice to TPs that are related to P1 and that are on R1 or R2. The control device selects, based on the bandwidth of P2 and the second slice request, P2 for deployment of the second network slice. The control device delivers configuration information corresponding to the second network slice to TPs that are related to P2 and that are on R1, R3, or R2. The control device selects, based on the bandwidth of P2 and the third slice request, P2 for deployment of the third network slice. The control device delivers configuration information corresponding to the third network slice to TPs that are related to P2 and that are on R1, R3, or R2. The control device further stores a correspondence between the first network slice and a network resource that is on P1 and that meets the requirement of the first network slice, a correspondence between the second network slice and a network resource that is on P2 and that meets the requirement of the second network slice, and a correspondence between the third network slice and a network resource that is on P2 and that meets the requirement of the third network slice.

After the control device creates the network slice, the isolation capability of the first node or the second node is changed. A node whose isolation capability is changed may communicate with the control device, so that the control device updates the generated resource topology. A method for updating the resource topology by the control device is described below by using an example in which the isolation capability of the first node is changed. After 311, the method provided in this embodiment of this application further includes: obtaining, by the control device, updated isolation information from the first node, where the updated isolation information is used to describe a newly added isolation capability in the first node or an invalid isolation capability in the first node; and updating, by the control device, the resource topology in 308 based on the updated isolation information and the resource topology generated in 308, thereby obtaining an updated resource topology. The updated resource topology is used to describe the topology, an updated isolation capability of the first node, the isolation capability of the second node, and an updated isolation capability of the link between the first node and the second node. After the isolation capability of the first node is changed, a parameter that is in the resource topology generated in 308 and related to the isolation capability of the first node needs to be updated, but the topology between the first node and the second node is not changed. When both the topology of the first node and the isolation capability of the first node are changed, the control device further needs to update the topology in the resource topology generated in 308.

In the method provided in this embodiment of this application, the control device can determine the isolation type of the slice based on the slice request, and thereby select, from the resource topology based on the isolation type, an element for implementing the slice, so that an isolation capability of the selected element matches the isolation type. Further, the control device generates, based on an isolation capability of an element in the network, a resource topology that can support some isolation capabilities. In this way, when creating the network slice, the control device may generate, based on the isolation capability supported by the resource topology, a slice having the isolation capability, and the slice can implement the isolation capability required by the service. The control device may flexibly obtain the configuration data according to the isolation policy, and thereby obtain the resource topology having a specific isolation capability.

Embodiment 2

Figure 5:
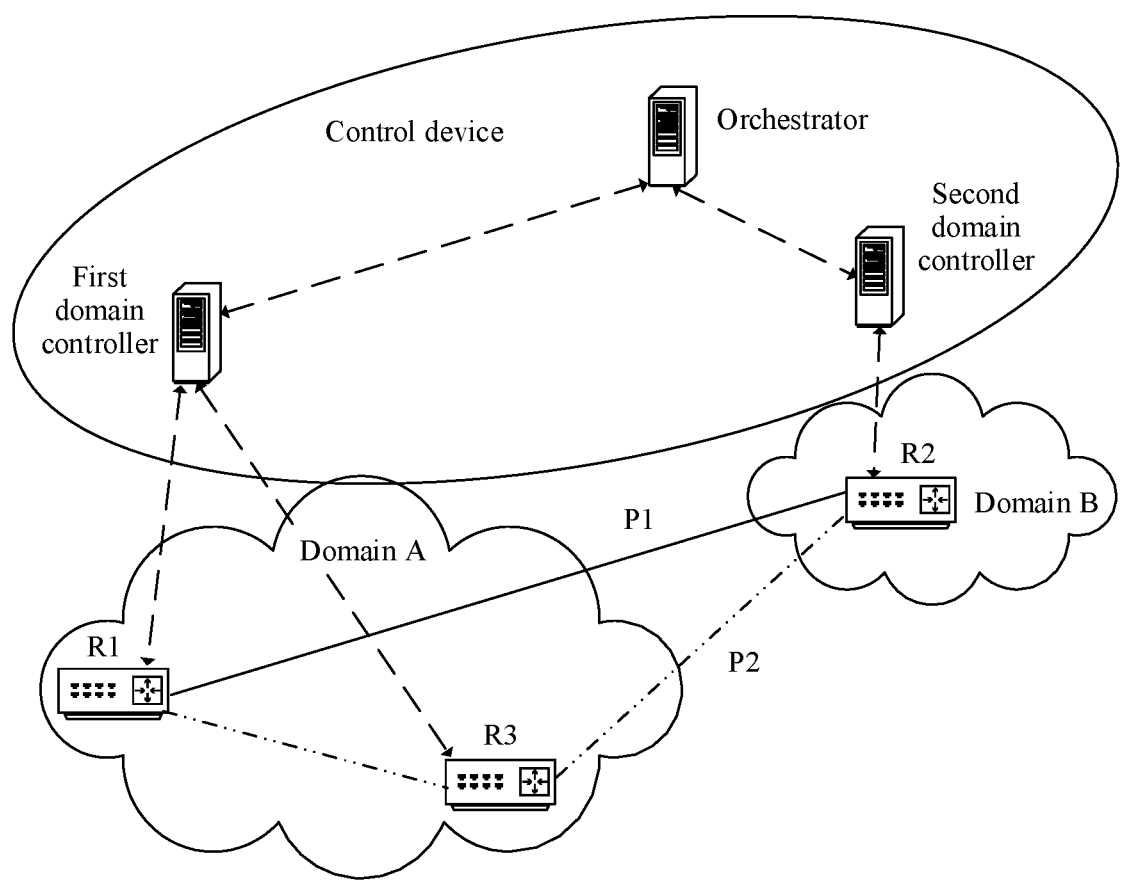
FIG. 5 is a schematic diagram of a network scenario according to Embodiment 2 of this application.

FIG. 5 is a schematic diagram of a network scenario according to Embodiment 2 of this application. In the scenario shown in FIG. 5, a domain A includes a plurality of nodes, for example, R1 and R3 in FIGS. 5. R1 and R3 may be edge nodes in the domain A. A domain B includes at least one node, for example, R2 in FIG. 5. R2 may be an edge node in the domain B. Types of the domain A and the domain B may be the same as those in Embodiment 1, and details are not described herein again. A control device can configure nodes in the domain A and the domain B. Specifically, a first domain controller included in the control device may communicate with a node in the domain A, and configure the node in the domain A. A second domain controller included in the control device may communicate with a node in the domain B, and configure the node in the domain B. An orchestrator included in the control device may communicate with the first domain controller and the second domain controller. In an implementation, the first domain controller, the second domain controller, and the orchestrator may be independent devices that are physically separated, and the three devices may interact with each other by using NETCONF. In another implementation, the first domain controller, the second domain controller, and the orchestrator may be integrated into one physical device, for example, the control device in FIG. 5. When the first domain controller, the second domain controller, and the orchestrator are integrated into one physical device, the first domain controller, the second domain controller, and the orchestrator may be chips or circuits on the physical device. R1 and R2 may communicate with each other through a plurality of paths, for example, P1 and P2 in FIGS. 5. P1 and P2 are used to identify different paths. A path identified by P1 may be represented as R1-R2. A path identified by P2 may be represented as R1-R3-R2.

A difference between the method for obtaining a network slice provided in Embodiment 2 and that in Embodiment 1 lies in that the orchestrator in Embodiment 2 may perform 301 and 308 to 310 in Embodiment 1. The orchestrator may execute 302 in Embodiment 1 by using the first domain controller, and execute 303 in Embodiment 1 by using the second domain controller. The first domain controller may obtain first resource information from a first node by performing 305. The first domain controller may send the first resource information to the orchestrator, or the first domain controller generates a resource topology of the domain A by using the method in 308 and sends the resource topology of the domain A to the orchestrator. The second domain controller may obtain second resource information from a second node by performing 307. The second domain controller may send the second resource information to the orchestrator, or the second domain controller generates a resource topology of the domain B by using the method in 308 and sends the resource topology of the domain B to the orchestrator. The domain controllers may obtain a resource topology based on the resource topology of the domain A and the resource topology of the domain B. For specific content, refer to corresponding content in Embodiment 1.

Figure 6:
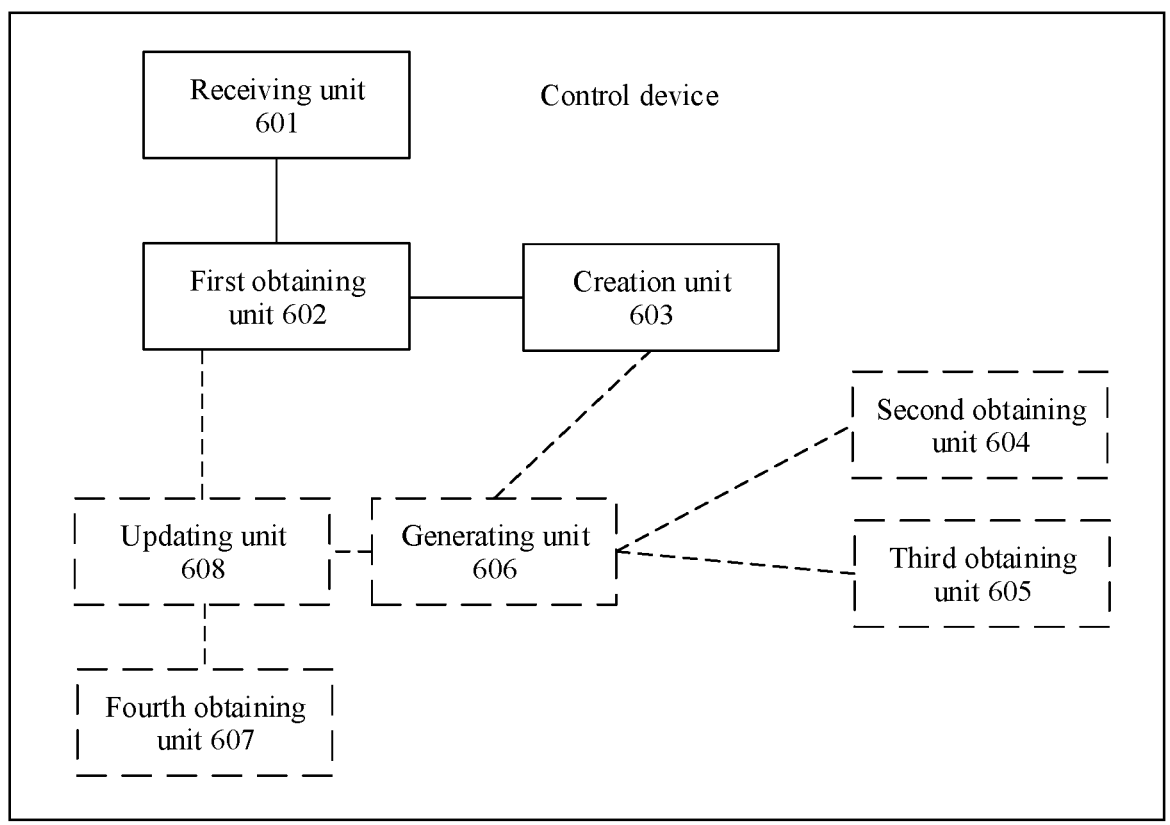
FIG. 6 is a schematic structural diagram of a control device according to Embodiment 3 of this application.

FIG. 6 is a schematic structural diagram of a control device according to Embodiment 3 of this application. The control device provided in Embodiment 3 is a device configured to obtain a network slice or a device configured to obtain a resource topology. The control device provided in Embodiment 3 includes a receiving unit 601, a first obtaining unit 602, and a creation unit 603. The receiving unit 601 is configured to receive a slice request sent by a user, where the slice request includes an identifier, and the identifier is used to identify an isolation level of a slice requested by the user. The first obtaining unit 602 is configured to obtain an isolation type of the slice based on the identifier. The creation unit 603 is configured to create a network slice based on the isolation type of the slice and a resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

In an implementation, the N elements include a first node, a second node, and a link between the first node and the second node; and the control device further includes a second obtaining unit 604, a third obtaining unit 605, and a generating unit 606. The second obtaining unit 604 is configured to obtain first resource information from the first node according to an isolation policy, where the first resource information includes isolation information provided by the first node and a topology of the first node. The third obtaining unit 605 is configured to obtain second resource information from the second node according to an isolation policy, where the second resource information includes isolation information provided by the second node and a topology of the second node. The generating unit 606 is configured to generate a resource topology based on the first resource information and the second resource information, where the resource topology is used to describe the network topology, an isolation capability of the first node, an isolation capability of the second node, and an isolation capability of the link between the first node and the second node, and the network topology is a topology between the first node and the second node.

When obtaining the first resource information, the second obtaining unit 604 is specifically configured to: generate first configuration data according to the isolation policy, where the first configuration data is used to describe the isolation capability of the first node; send the first configuration data to the first node; and receive the first resource information sent by the first node, where the first resource information includes the isolation information provided by the first node and the topology of the first node, and the topology of the first node is used to describe the first node and a link on which the first node is located. When obtaining the second resource information, the third obtaining unit 605 is specifically configured to: generate second configuration data according to the isolation policy, where the second configuration data is used to describe the isolation capability of the second node; send the second configuration data to the second node; and receive the second resource information sent by the second node, where the second resource information includes the isolation information provided by the second node and the topology of the second node, and the topology of the second node is used to describe the second node and a link on which the second node is located.

When obtaining the first configuration data, the second obtaining unit 604 is specifically configured to: obtain the isolation capability of the first node according to the isolation policy, where the isolation capability of the first node includes isolation capabilities of the first node and the link on which the first node is located; and generate, based on the isolation capability of the first node and a data model, the first configuration data described by using the data model. When obtaining the second configuration data, the third obtaining unit 605 is specifically configured to: obtain the isolation capability of the second node according to the isolation policy, where the isolation capability of the second node includes isolation capabilities of the second node and the link on which the second node is located; and generate, based on the isolation capability of the second node and a data model, the second configuration data described by using the data model.

For example, the generating unit 606 is specifically configured to: determine a first isolation type based on the isolation information provided by the first node and the isolation information provided by the second node; and obtain, based on the first isolation type and the network topology, a first resource topology matching the first isolation type, where an isolation capability of a node included in the first resource topology is the first isolation type, and an isolation capability of a link included in the first resource topology is the first isolation type. After obtaining the first resource topology, the generating unit 606 may be further configured to obtain a second resource topology, which specifically includes: determining a second isolation type based on the isolation information provided by the first node and the isolation information provided by the second node; and obtaining, based on the second isolation type and the network topology, the second resource topology matching the second isolation type, where an isolation capability of a node included in the second resource topology is the second isolation type, and an isolation capability of a link included in the second resource topology is the second isolation type.

In an implementation, the first isolation type is fine-grained physical isolation, coarse-grained physical isolation, or logical isolation, the second isolation type is fine-grained physical isolation, coarse-grained physical isolation, or logical isolation, and the second isolation type is different from the first isolation type. In another implementation, the first isolation type is network isolation, link isolation, or node isolation, the second isolation type is network isolation, node physical isolation, or link isolation, and the second isolation type is different from the first isolation type.

For example, the creation unit 603 is specifically configured to: select, from the resource topology based on the isolation type of the slice, a sub-resource topology matching the isolation type of the slice, where an isolation capability of a node included in the sub-resource topology is the isolation type of the slice, and an isolation capability of a link included in the sub-resource topology is the isolation type of the slice; and store a correspondence between the sub-resource topology and the identifier. The creation unit 603 is further configured to: obtain, based on the slice request, service information corresponding to the slice; obtain an ingress TP and an egress TP of a third node based on the sub-resource topology, where an isolation capability of the ingress TP is an isolation capability of the slice, an isolation capability of the egress TP is the isolation capability of the slice, the isolation capability of the ingress TP supports the isolation capability of the node included in the sub-resource topology and the isolation capability of the link included in the sub-resource topology, and the isolation capability of the egress TP supports the isolation capability of the node included in the sub-resource topology and the isolation capability of the link included in the sub-resource topology; and send, to the third node, a correspondence including the service information, the ingress TP, and the egress TP. The third node may be the first node or the second node, or the third node is a node except the first node and the second node.

For example, the control device can further update the generated resource topology, and the control device further includes a fourth obtaining unit 607 and an updating unit 608. The fourth obtaining unit 607 is configured to obtain updated isolation information from the first node, where the updated isolation information is used to describe a newly added isolation capability in the first node or an invalid isolation capability in the first node. The updating unit 608 is configured to obtain an updated resource topology based on the updated isolation information and the resource topology, where the updated resource topology is used to describe the network topology, an updated isolation capability of the first node, the isolation capability of the second node, and an updated isolation capability of the link between the first node and the second node.

For example, the isolation level is a user level, a service level, a tunnel level, a system level, a slot level, a wavelength level, a port level, a device level, or a network level. The isolation capability in this embodiment of this application is an isolation function that is of an element and that corresponds to the isolation level. The element may be anode or a link, and may be specifically a node TP or a link TP. The isolation information in this embodiment of this application is an isolation capability supported by a specific TP of the element. The isolation capability supported by the TP may be represented by an isolation level in a multi-bit form, for example, in a form of the YANG model in the foregoing embodiment.

The units included in the control device provided in Embodiment 3 can perform corresponding functions of the control device provided in Embodiment 1. The receiving unit 601 is configured to support the control device in executing 309 in Embodiment 1. The first obtaining unit 602 is configured to support the control device in obtaining the isolation type of the slice based on the slice request in 310 in Embodiment 1. The creation unit 603 is configured to support the control device in obtaining the network resource in 310 and 311 in Embodiment 1. The second obtaining unit 604 is configured to support the control device in generating the first configuration data in 301, 302, and 305 in Embodiment 1. The third obtaining unit 605 is configured to support the control device in generating second configuration data in 301, 303, and 307 in Embodiment 1. The generating unit 606 is configured to support the control device in performing 308 in Embodiment 1.

Figure 7:
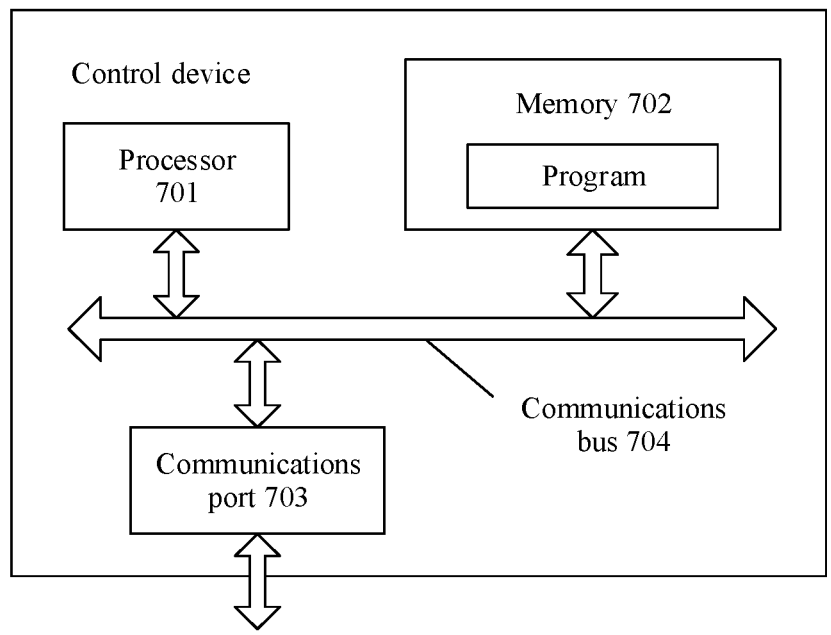
FIG. 7 is a schematic structural diagram of a control device according to Embodiment 4 of this application.

FIG. 7 is a schematic structural diagram of a control device according to Embodiment 4 of this application. The control device provided in Embodiment 4 may be the same as the control device provided in Embodiment 3. A device structure of the control device provided in Embodiment 4 is described from a perspective of hardware. The control device includes a processor 701, a memory 702, a communications bus 704, and a communications interface 703. The processor 701, the memory 702, and the communications interface 703 are connected by using the communications bus 704. The memory 702 is configured to store a program. The processor 701 performs, according to an executable instruction included in the program read from the memory 702, the method performed by the control device in the foregoing Embodiment 1. The processor 701 may receive a packet or a message from a user, a first node, or a second node by using the communications interface 703.

When the control device has a function of the control device in Embodiment 1, the communications interface 703 is configured to support the control device in performing 302, 303, 305, 307, and 309 in Embodiment 1. The processor 701 is configured to support the control device in performing 301, 308, 310, and 311 in Embodiment 1. In addition to storing program code and data, the memory 702 is further configured to cache the isolation information, the correspondence, and the resource topology in Embodiment 1.

Figure 8:
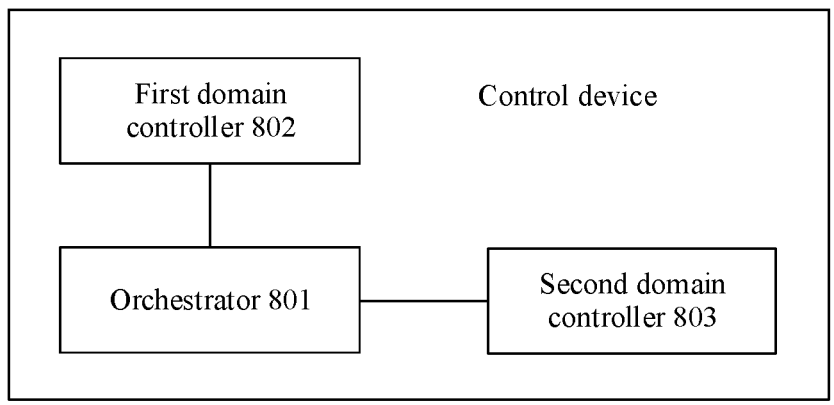
FIG. 8 is a schematic structural diagram of a control device according to Embodiment 5 of this application.

FIG. 8 is a schematic structural diagram of a control device according to Embodiment 5 of this application. The control device provided in Embodiment 5 may perform a corresponding function of the control device provided in Embodiment 2. The control device provided in Embodiment 5 includes an orchestrator 801. The orchestrator 801 is configured to: receive a slice request sent by a user, where the slice request includes an identifier, and the identifier is used to identify an isolation level of a slice requested by the user; obtain an isolation type of the slice based on the identifier; and create a network slice based on the isolation type of the slice and a resource topology, where the resource topology is used to describe a network topology and isolation capabilities of N elements in the network topology, the N elements include at least one of a node and a link, N is an integer greater than or equal to 1, and the network slice includes a node and a link that are required for implementing the slice.

In an implementation, the control device further includes a first domain controller 802 and a second domain controller 803. The N elements include a first node, a second node, and a link between the first node and the second node. The first domain controller 802 is configured for communication between the orchestrator 801 and the first node. The second domain controller 803 is configured for communication between the orchestrator 801 and the second node. The orchestrator is specifically configured to: obtain first resource information from the first node according to an isolation policy by using the first domain controller 802, where the first resource information includes isolation information provided by the first node and a topology of the first node; obtain second resource information from the second node according to an isolation policy by using the second domain controller 803, where the second resource information includes isolation information provided by the second node and a topology of the second node; and generate a resource topology based on the first resource information and the second resource information, where the resource topology is used to describe the network topology, an isolation capability of the first node, an isolation capability of the second node, and an isolation capability of the link between the first node and the second node, and the network topology is a topology between the first node and the second node.

In an implementation, the orchestrator 801 is specifically configured to: generate first configuration data according to the isolation policy, where the first configuration data is used to describe the isolation capability of the first node; and generate second configuration data according to the isolation policy, where the second configuration data is used to describe the isolation capability of the second node. The first domain controller 801 is specifically configured to: send the first configuration data from the orchestrator to the first node; and receive the first resource information sent by the first node, where the first resource information includes the isolation information provided by the first node and the topology of the first node, and the topology of the first node is used to describe the first node and a link on which the first node is located. The second domain controller 802 is specifically configured to: send the second configuration data from the orchestrator to the second node; and receive the second resource information sent by the second node, where the second resource information includes the isolation information provided by the second node and the topology of the second node, and the topology of the second node is used to describe the second node and a link on which the second node is located.

When obtaining the first configuration data, the orchestrator 801 is specifically configured to: obtain the isolation capability of the first node according to the isolation policy, where the isolation capability of the first node includes isolation capabilities of the first node and the link on which the first node is located; and generate, based on the isolation capability of the first node and a data model, the first configuration data described by using the data model. When obtaining the second configuration data, the orchestrator 801 is specifically configured to: obtain the isolation capability of the second node according to the isolation policy, where the isolation capability of the second node includes isolation capabilities of the second node and the link on which the second node is located; and generate, based on the isolation capability of the second node and a data model, the second configuration data described by using the data model.

For example, the orchestrator 801 is specifically configured to: determine a first isolation type based on the isolation information provided by the first node and the isolation information provided by the second node; and obtain, based on the first isolation type and the network topology, a first resource topology matching the first isolation type, where an isolation capability of a node included in the first resource topology is the first isolation type, and an isolation capability of a link included in the first resource topology is the first isolation type. After obtaining the first resource topology, the generating unit 606 may be further configured to obtain a second resource topology, which specifically includes: determining a second isolation type based on the isolation information provided by the first node and the isolation information provided by the second node; and obtaining, based on the second isolation type and the network topology, the second resource topology matching the second isolation type, where an isolation capability of a node included in the second resource topology is the second isolation type, and an isolation capability of a link included in the second resource topology is the second isolation type.

For example, the orchestrator 801 is specifically configured to: select, from the resource topology based on the isolation type of the slice, a sub-resource topology matching the isolation type of the slice, where an isolation capability of a node included in the sub-resource topology is the isolation type of the slice, and an isolation capability of a link included in the sub-resource topology is the isolation type of the slice; and store a correspondence between the sub-resource topology and the identifier. The orchestrator 801 is further configured to: obtain, based on the slice request, service information corresponding to the slice; obtain an ingress TP and an egress TP of a third node based on the sub-resource topology, where an isolation capability of the ingress TP is an isolation capability of the slice, an isolation capability of the egress TP is the isolation capability of the slice, the isolation capability of the ingress TP supports the isolation capability of the node included in the sub-resource topology and the isolation capability of the link included in the sub-resource topology, and the isolation capability of the egress TP supports the isolation capability of the node included in the sub-resource topology and the isolation capability of the link included in the sub-resource topology; and send, to the third node, a correspondence including the service information, the ingress TP, and the egress TP. The third node may be the first node or the second node, or the third node is a node except the first node and the second node.

For example, the control device can further update the generated resource topology, and the orchestrator 801 is further configured to: obtain updated isolation information from the first node, where the updated isolation information is used to describe a newly added isolation capability in the first node or an invalid isolation capability in the first node; and obtain an updated resource topology based on the updated isolation information and the resource topology, where the updated resource topology is used to describe the network topology, an updated isolation capability of the first node, the isolation capability of the second node, and an updated isolation capability of the link between the first node and the second node.

A hardware structure of the control device provided in Embodiment 5 may perform corresponding functions of the control device provided in Embodiment 2. For specific functions supported by the orchestrator 801, the first domain controller 802, and the second domain controller 803, refer to corresponding content in Embodiment 2.

Figure 9:
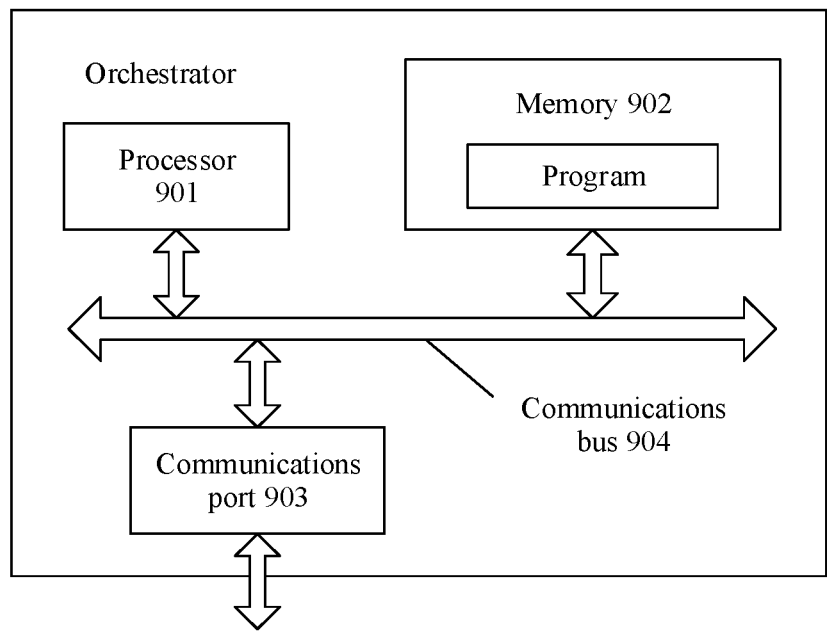
FIG. 9 is a schematic structural diagram of a control device according to Embodiment 6 of this application.

FIG. 9 is a schematic structural diagram of a control device according to Embodiment 6 of this application. An orchestrator included in the control device provided in Embodiment 6 may be the same as the orchestrator included in the control device provided in Embodiment 5. A structure of the orchestrator of the control device provided in Embodiment 6 is described from a perspective of hardware. The orchestrator includes a processor 901, a memory 902, a communications bus 904, and a communications interface 903. The processor 901, the memory 902, and the communications interface 903 are connected by using the communications bus 904. The memory 902 is configured to store a program. The processor 901 executes, according to an executable instruction included in the program read from the memory 902, content of 301, 302, 303, and 308 to 311 executed by the control device in Embodiment 1. The processor 901 may receive a packet or a message from a user, a first node, or a second node by using the communications interface 903. When the orchestrator has a function of the control device in Embodiment 1, the communications interface 903 is configured to support the orchestrator in performing 302, 303, and 309 in Embodiment 1. The processor 901 is configured to support the orchestrator in performing 301, 308, 310, and 311 in Embodiment 1. In addition to storing program code and data, the memory 902 is further configured to cache the isolation information, the correspondence, and the resource topology in Embodiment 1.

Figure 10:
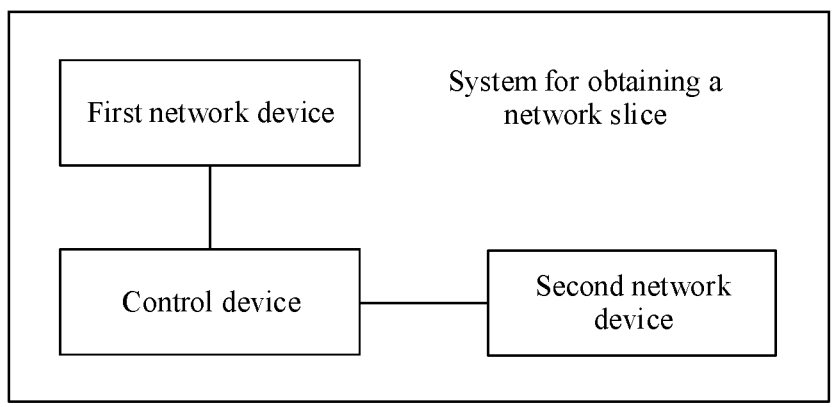
FIG. 10 is a schematic structural diagram of a system used to obtain a network slice according to an embodiment of this application.

FIG. 10 is a schematic structural diagram of a system used to obtain a network slice according to an embodiment of this application. The system may include a first network device, a second network device, and a control device. The first network device may be the first node in Embodiment 1 or Embodiment 2. The second network device may be the second node in Embodiment 1 or Embodiment 2. The control device may be the control device mentioned in any one of Embodiment 1 to Embodiment 6. For a structure of the control device, refer to corresponding content in Embodiment 3 to Embodiment 6. For a function of the first network device, refer to content related to the first node in Embodiment 1 or Embodiment 2. For a function of the second network device, refer to content related to the second node in Embodiment 1 or Embodiment 2.

In the embodiments of this application, the domain A and the domain B are used as an example for description. When it is required to obtain a network slice in a domain, the method provided in the embodiments of this application may be used: A controller or a control device of the domain obtains, based on resource information fed back by an element in the domain, a resource topology corresponding to the domain. The controller or the control device of the domain may create, based on a slice request from a user and the method in the foregoing embodiments, a network slice that meets a requirement of the user. For specific content, refer to corresponding content in Embodiment 1 or Embodiment 2.

A general purpose processor mentioned in the embodiments of this application may be a microprocessor, or the processor may be any conventional processor. Steps of the method disclosed with reference to the embodiments of the invention may be directly implemented by a combination of hardware and a software module in the processor. When the method is implemented by using software, code that implements the foregoing functions may be stored in a computer-readable medium. The computer-readable medium includes a computer storage medium. The storage medium may be any available medium accessible to a computer, and may include but is not limited to the following examples. The computer-readable medium may be a random-access memory (RAM), a read-only memory (ROM), an electrically erasable programmable read-only memory (EEPROM), a compact disc read-only memory (CD-ROM) or another optical disc memory, a magnetic disc storage medium or another magnetic disc storage device, or any other medium that can be configured to carry or store expected program code in an instruction or data structure form and that can be accessed by a computer. The computer-readable medium may be a compact disc CD), a laser disc, a digital versatile disc (DVD), a floppy disc, or a Blu-ray disc.

The embodiments in this specification are all described in a progressive manner. For same or similar parts of the embodiments, reference may be made to each other. Each embodiment focuses on a difference from other embodiments. Especially, a system embodiment is basically similar to a method embodiment, and therefore is described briefly, and for related parts, reference may be made to some descriptions in the method embodiment.

What is claimed is:

1. A method for obtaining a network slice, wherein the method comprises:
    receiving, by a control device, a slice request sent by a user, wherein the slice request comprises an identifier, and the identifier is used to identify an isolation level of a slice requested by the user;
    obtaining, by the control device, an isolation type of the slice based on the identifier; and
    creating, by the control device, a network slice based on the isolation type of the slice and a resource topology, wherein the resource topology is used to describe a network topology and isolation capabilities of N elements in the network topology, the N elements comprise at least one of a node and a link, N is an integer greater than or equal to 1, and the network slice comprises a node and a link that are required for implementing the slice.

2. The method according to claim 1, wherein the N elements comprise a first node, a second node, and a link between the first node and the second node, and the method further comprises:
    obtaining, by the control device, first resource information from the first node according to an isolation policy, wherein the first resource information comprises isolation information provided by the first node and a topology of the first node;
    obtaining, by the control device, second resource information from the second node according to an isolation policy, wherein the second resource information comprises isolation information provided by the second node and a topology of the second node; and
    generating, by the control device, a resource topology based on the first resource information and the second resource information, wherein the resource topology is used to describe the network topology, an isolation capability of the first node, an isolation capability of the second node, and an isolation capability of the link between the first node and the second node, and the network topology is a topology between the first node and the second node.

3. The method according to claim 2, wherein the obtaining, by the control device, first resource information from the first node according to an isolation policy comprises:
    generating, by the control device, first configuration data according to the isolation policy, wherein the first configuration data is used to describe the isolation capability of the first node;
    sending, by the control device, the first configuration data to the first node; and
    receiving, by the control device, the first resource information sent by the first node, wherein the first resource information comprises the isolation information provided by the first node and the topology of the first node, and the topology of the first node is used to describe the first node and a link on which the first node is located; and
    the obtaining, by the control device, second resource information from the second node according to an isolation policy comprises:
    generating, by the control device, second configuration data according to the isolation policy, wherein the second configuration data is used to describe the isolation capability of the second node;
    sending, by the control device, the second configuration data to the second node; and
    receiving, by the control device, the second resource information sent by the second node, wherein the second resource information comprises the isolation information provided by the second node and the topology of the second node, and the topology of the second node is used to describe the second node and a link on which the second node is located.

4. The method according to claim 3, wherein the generating, by the control device, first configuration data according to the isolation policy comprises:
    obtaining, by the control device, the isolation capability of the first node according to the isolation policy, wherein the isolation capability of the first node comprises isolation capabilities of the first node and the link on which the first node is located; and
    generating, by the control device based on the isolation capability of the first node and a data model, the first configuration data described by using the data model; and
    the generating, by the control device, second configuration data according to the isolation policy comprises:
    obtaining, by the control device, the isolation capability of the second node according to the isolation policy, wherein the isolation capability of the second node comprises isolation capabilities of the second node and the link on which the second node is located; and
    generating, by the control device based on the isolation capability of the second node and the data model, the second configuration data described by using the data model.

5. The method according to claim 2, wherein the generating, by the control device, a resource topology based on the first resource information and the second resource information comprises:

determining, by the control device, a first isolation type based on the isolation information provided by the first node and the isolation information provided by the second node; and obtaining, by the control device based on the first isolation type and the network topology, a first resource topology matching the first isolation type, wherein an isolation capability of a node comprised in the first resource topology is the first isolation type, and an isolation capability of a link comprised in the first resource topology is the first isolation type.

6. The method according to claim 5, wherein the generating, by the control device, a resource topology based on the first resource information and the second resource information further comprises:

determining, by the control device, a second isolation type based on the isolation information provided by the first node and the isolation information provided by the second node; and obtaining, by the control device based on the second isolation type and the network topology, a second resource topology matching the second isolation type, wherein an isolation capability of a node comprised in the second resource topology is the second isolation type, and an isolation capability of a link comprised in the second resource topology is the second isolation type.

7. The method according to claim 5, wherein the first isolation type is fine-grained physical isolation, coarse-grained physical isolation, or logical isolation, the second isolation type is fine-grained physical isolation, coarse-grained physical isolation, or logical isolation, and the second isolation type is different from the first isolation type; or the first isolation type is network isolation, link isolation, or node isolation, the second isolation type is network isolation, node physical isolation, or link isolation, and the second isolation type is different from the first isolation type.

8. The method according to claim 1, wherein the creating, by the control device, a network slice based on the isolation type of the slice and a resource topology comprises:

selecting, by the control device from the resource topology based on the isolation type of the slice, a sub-resource topology matching the isolation type of the slice, wherein an isolation capability of a node comprised in the sub-resource topology is the isolation type of the slice, and an isolation capability of a link comprised in the sub-resource topology is the isolation type of the slice; and storing, by the control device, a correspondence between the sub-resource topology and the identifier.

9. The method according to claim 8, wherein the creating, by the control device, a network slice based on the isolation type of the slice and a resource topology further comprises:

obtaining, by the control device based on the slice request, service information corresponding to the slice;

obtaining, by the control device, an ingress terminal point (TP) and an egress TP of a third node based on the sub-resource topology, wherein an isolation capability of the ingress TP is an isolation capability of the slice, an isolation capability of the egress TP is the isolation capability of the slice, the isolation capability of the ingress TP supports the isolation capability of the node comprised in the sub-resource topology and the isolation capability of the link comprised in the sub-resource topology, and the isolation capability of the egress TP supports the isolation capability of the node comprised in the sub-resource topology and the isolation capability of the link comprised in the sub-resource topology; and sending, by the control device to the third node, a correspondence comprising the service information, the ingress TP, and the egress TP.

10. The method according to claim 1, wherein after the creating a network slice, the method further comprises:

obtaining, by the control device, updated isolation information from the first node, wherein the updated isolation information is used to describe a newly added isolation capability in the first node or an invalid isolation capability in the first node; and obtaining, by the control device, an updated resource topology based on the updated isolation information and the resource topology, wherein the updated resource topology is used to describe the network topology, an updated isolation capability of the first node, the isolation capability of the second node, and an updated isolation capability of the link between the first node and the second node.

11. The method according to claim 1, wherein the isolation level is a user level, a service level, a tunnel level, a system level, a slot level, a wavelength level, a port level, a device level, or a network level; and the isolation capability is an isolation function that is of an element and that corresponds to the isolation level.

12. A control device, wherein the control device comprises:

a processor; and a non-transitory computer-readable storage medium coupled to the processor and storing programming instructions for execution by the processor, the programming instructions instruct the processor to:

receive a slice request sent by a user, wherein the slice request comprises an identifier, and the identifier is used to identify an isolation level of a slice requested by the user;

obtain an isolation type of the slice based on the identifier; and create a network slice based on the isolation type of the slice and a resource topology, wherein the resource topology is used to describe a network topology and isolation capabilities of N elements in the network topology, the N elements comprise at least one of a node and a link, N is an integer greater than or equal to 1, and the network slice comprises a node and a link that are required for implementing the slice.

13. The control device according to claim 12, wherein the N elements comprise a first node, a second node, and a link between the first node and the second node, and the programming instructions further instruct the processor to:

obtain first resource information from the first node according to an isolation policy, wherein the first resource information comprises isolation information provided by the first node and a topology of the first node;

obtain second resource information from the second node according to an isolation policy, wherein the second resource information comprises isolation information provided by the second node and a topology of the second node; and generate a resource topology based on the first resource information and the second resource information, wherein the resource topology is used to describe the network topology, an isolation capability of the first node, an isolation capability of the second node, and an isolation capability of the link between the first node and the second node, and the network topology is a topology between the first node and the second node.

14. The control device according to claim 13, wherein the programming instructions instruct the processor to: generate first configuration data according to the isolation policy, wherein the first configuration data is used to describe the isolation capability of the first node; send the first configuration data to the first node; and receive the first resource information sent by the first node, wherein the first resource information comprises the isolation information provided by the first node and the topology of the first node, and the topology of the first node is used to describe the first node and a link on which the first node is located; and generate second configuration data according to the isolation policy, wherein the second configuration data is used to describe the isolation capability of the second node; send the second configuration data to the second node; and receive the second resource information sent by the second node, wherein the second resource information comprises the isolation information provided by the second node and the topology of the second node, and the topology of the second node is used to describe the second node and a link on which the second node is located.

15. The control device according to claim 14, wherein the programming instructions instruct the processor to: obtain the isolation capability of the first node according to the isolation policy, wherein the isolation capability of the first node comprises isolation capabilities of the first node and the link on which the first node is located; and generate, based on the isolation capability of the first node and a data model, the first configuration data described by using the data model; and obtain the isolation capability of the second node according to the isolation policy, wherein the isolation capability of the second node comprises isolation capabilities of the second node and the link on which the second node is located; and generate, based on the isolation capability of the second node and the data model, the second configuration data described by using the data model.

16. The control device according to claim 13, wherein the programming instructions instruct the processor to:

determine a first isolation type based on the isolation information provided by the first node and the isolation information provided by the second node; and obtaining, based on the first isolation type and the network topology, a first resource topology matching the first isolation type, wherein an isolation capability of a node comprised in the first resource topology is the first isolation type, and an isolation capability of a link comprised in the first resource topology is the first isolation type.

17. The control device according to claim 16, wherein the programming instructions instruct the processor to:

determine a second isolation type based on the isolation information provided by the first node and the isolation information provided by the second node; and obtain, based on the second isolation type and the network topology, a second resource topology matching the second isolation type, wherein an isolation capability of a node comprised in the second resource topology is the second isolation type, and an isolation capability of a link comprised in the second resource topology is the second isolation type.

18. The control device according to claim 16, wherein the first isolation type is fine-grained physical isolation, coarse-grained physical isolation, or logical isolation, the second isolation type is fine-grained physical isolation, coarse-grained physical isolation, or logical isolation, and the second isolation type is different from the first isolation type; or the first isolation type is network isolation, link isolation, or node isolation, the second isolation type is network isolation, node physical isolation, or link isolation, and the second isolation type is different from the first isolation type.

19. The control device according to claim 12, wherein the programming instructions instruct the processor to:

select, from the resource topology based on the isolation type of the slice, a sub-resource topology matching the isolation type of the slice, wherein an isolation capability of a node comprised in the sub-resource topology is the isolation type of the slice, and an isolation capability of a link comprised in the sub-resource topology is the isolation type of the slice; and store a correspondence between the sub-resource topology and the identifier.

20. The control device according to claim 19, wherein the programming instructions instruct the processor to:

obtain, based on the slice request, service information corresponding to the slice;

obtain an ingress terminal point (TP) and an egress TP of a third node based on the sub-resource topology, wherein an isolation capability of the ingress TP is an isolation capability of the slice, an isolation capability of the egress TP is the isolation capability of the slice, the isolation capability of the ingress TP supports the isolation capability of the node comprised in the sub-resource topology and the isolation capability of the link comprised in the sub-resource topology, and the isolation capability of the egress TP supports the isolation capability of the node comprised in the sub-resource topology and the isolation capability of the link comprised in the sub-resource topology; and send, to the third node, a correspondence comprising the service information, the ingress TP, and the egress TP.

21. The control device according to claim 12, wherein the programming instructions further instruct the processor to:

obtain updated isolation information from the first node, wherein the updated isolation information is used to describe a newly added isolation capability in the first node or an invalid isolation capability in the first node; and obtain an updated resource topology based on the updated isolation information and the resource topology, wherein the updated resource topology is used to describe the network topology, an updated isolation capability of the first node, the isolation capability of the second node, and an updated isolation capability of the link between the first node and the second node.

22. The control device according to claim 12, wherein the isolation level is a user level, a service level, a tunnel level, a system level, a slot level, a wavelength level, a port level, a device level, or a network level; and the isolation capability is an isolation function that is of an element and that corresponds to the isolation level.

* * * * *